(12) United States Patent  
Oki et al.

(10) Patent No.: US 8,376,634 B2
(45) Date of Patent: Feb. 19, 2013

(54) PLUGGABLE OPTICAL TRANSCEIVER AND METHOD FOR MANUFACTURING THE SAME

(75) Inventors: Kazushige Oki, Yokohama (JP);
Hirokazu Komachi, Yokohama (JP);
Takahisa Wada, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 328 days.

(21) Appl. No.: 12/916,080

(22) Filed: Oct. 29, 2010

(65) Prior Publication Data
US 2011/0103797 A1 May 5, 2011

Related U.S. Application Data

(60) Provisional application No. 61/261,105, filed on Nov. 13, 2009, provisional application No. 61/314,801, filed on Mar. 17, 2010.

(30) Foreign Application Priority Data

| Oct. 29, 2009 | (JP) | P2009-248592 |
| Mar. 31, 2010 | (JP) | P2010-083610 |
| Apr. 30, 2010 | (JP) | P2010-105557 |
| Apr. 30, 2010 | (JP) | P2010-105560 |
| May 18, 2010 | (JP) | P2010-114311 |
| Sep. 24, 2010 | (JP) | P2010-213701 |

(51) Int. Cl.
*G02B 6/36* (2006.01)
(52) U.S. Cl. ............................................. 385/92; 385/89
(58) Field of Classification Search .................. None
See application file for complete search history.

(56) References Cited

U.S. PATENT DOCUMENTS

| 5,943,461 | A | 8/1999 | Shahid | |
| 6,804,431 | B2 * | 10/2004 | Kowalkowski et al. | 385/24 |
| 2004/0184745 | A1 * | 9/2004 | Mynatt et al. | 385/94 |
| 2005/0036746 | A1 * | 2/2005 | Scheibenreif et al. | 385/92 |
| 2008/0095541 | A1 * | 4/2008 | Dallesasse | 398/191 |
| 2009/0016685 | A1 | 1/2009 | Hudgins et al. | |
| 2009/0052898 | A1 * | 2/2009 | Oki et al. | 398/79 |

OTHER PUBLICATIONS

CPF Multi-Source Agreement (MSA) Draft 1.0, pp. 1-52, Mar. 23, 2009.

* cited by examiner

*Primary Examiner* — Mike Stahl
(74) *Attorney, Agent, or Firm* — Venable LLP; Michael A. Sartori

(57) ABSTRACT

A pluggable optical transceiver is disclosed. The transceiver comprises a plurality of OSAs, an optical member and a plurality of inner fibers to couple the optical member with OSAs. The inner fibers each provides an inner connector to couple with one of OSAs. The housing, which installs the OSAs, the optical member and the inner fiber, is made of metal and has a grooves into which the inner fibers is set so as to arrange them orderly.

17 Claims, 34 Drawing Sheets

PLUGGABLE OPTICAL TRANSCEIVER AND METHOD FOR MANUFACTURING THE SAME

CROSS REFERENCE TO RELATED APPLICATIONS

This application claims the benefit of U.S. Provisional patent application Ser. No. 61/261,105 filed Nov. 13, 2009, and Ser. No. 61/314,801 filed Mar. 17, 2010, which are incorporated herein by references.

BACKGROUND OF THE INVENTION

1. Field of the Invention

The present invention relates to a pluggable optical transceiver with a function of at least one of the optical transmission and the optical reception, in particular, the invention relates to an optical transceiver able to transmit a plurality of optical signals each having a specific wavelength different from others, and to receive a plurality of optical signals each having a specific wavelength different from others.

2. Related Background Art

The United States patent, U.S. Pat. No. 5,943,461B, has disclosed an optical transceiver providing an optical connector coupled with an optical plug attached in a tip of the external fiber. An optical fiber is drawn from the optical connector to couple with an optical subassembly (hereafter denoted as OSA) that installs a semiconductor device, such as semiconductor laser diode (LD) for a transmitter OSA (TOSA) or a semiconductor photodiode (PD) for a recover OSA (ROSA).

The transmission speed of the optical communication has been accelerated and the transmission speed over 10 Gbps, typically 40 Gbps and 100 Gbps, is now available. The semiconductor device in the OSA is quite hard to follow such high speed alone. The intelligent system of the wavelength division multiplexing (WDM) is ordinarily applied. For instance, four signal channels each showing the speed of 10 Gbps and having a specific wavelength different from others are wavelength multiplexed, which equivalently shows the transmission speed of 40 Gbps, and thus multiplexed optical signal is transmitted in the single optical fiber. In the system with the speed of 100 Gbps, four (4) signal channels each having the speed of 25 Gbps are multiplexed or ten (10) signal channels each showing the speed of 10 Gbps are multiplexed to realize the equivalent transmission speed of 100 Gbps. One agreement, CFP-MSA-Draft-rev-1.0, has specified the standard of the 100 Gbps transmission.

An optical transceiver satisfying the WDM standard installs a plurality of TOSAs and ROSAs, an optical multiplexer and an optical demultiplexer. Another type of an optical transceiver for the WDM communication installs an optical unit integrating a plurality of TOSAs with an optical multiplexer and another optical unit integrating a plurality of ROSAs with an optical demultiplexer to eliminate or to decrease the number of inner fibers connecting the optical components. However, such an integrated optical device has a demerit that the whole component is necessary to be replaced even when only one of the TOSAs or only one of the ROSAs becomes failure. In particular, the TOSAs and the ROSAs operable in such high speed region are hard to be available, or often have a restricted margin for the specification; a situation to replace a degraded OSA would be often encountered.

For the optical transceiver installing TOSAs and ROSAs individually, inner fibers coupling each component are scattered. Moreover, the optical fiber has an inherent characteristic to increase the transmission loss by the bending. Conventional optical fiber limits the least bent radius of 15 mm. Even an improved fiber limits the minimum bent radius to be 5 mm. Thus, a surplus length is necessary to be prepared for the inner fibers, which means that lengthy fibers run within the optical transceiver disorderly without adequate wiring of the inner fibers.

SUMMARY OF THE INVENTION

One aspect of the present invention relates to an optical communication apparatus for the WDM communication system. The apparatus comprises a plurality of optical components, an electronic component, a plurality of inner fibers and a housing. The optical components include an optical receptacle, a plurality of OSAs, and an optical unit. The OSAs may be TOSAs or ROSAs, while, the optical unit may be an optical multiplexer or an optical demultiplexer depending on the type of OSAs. The multiplexer may multiplex a plurality of optical signals each transmitted from respective TOSAs and having a specific wavelength different from others. The optical demultiplexer may demultiplex a optical signal externally provided into a plurality of optical signals each having a specific wavelength different from others; and transmits demultiplexed optical signal to respective ROSAs. The electronic component includes a circuit mounted on a circuit board and electrically coupled with the TOSAs and ROSAs. The inner fibers may optically couple the optical receptacle with the optical multiplexer and the optical demultiplexer; and couple the optical multiplexer with the TOSAs and the optical demultiplexer with the ROSAs. The housing may install the optical components, the electrical components and the inner fibers therein. One feature of the communication apparatus according to the present invention is that the housing is divided into two sections, one of which installs only the optical components, while, the other installs only the electronic components, and the inner fibers may be coupled with optical components in the pluggable form.

Because the housing is distinguishably divided into two sections, the inner fibers may run under the optical components in the one section and under the circuit board in the other section. The optical components may further include a plurality of inner connectors, a front tray and a latch unit. Each inner connector is provided in or associated with the end of the inner fiber and coupled with OSA in the pluggable form. The front tray may support the inner connector and arrange the inner fiber. The latch unit may support the OSA and may be coupled with the inner connector in two positions.

The front tray may provide a plurality of slots. Each of the slots may receive one of inner fibers and provide a pair of latch fingers to engage with the inner connector. The slot may further provide an eave to prevent the fiber set therein from straying out and a guide in a side thereof to turn the inner fibers running the side of the front tray from the longitudinal direction to the lateral direction.

The communication apparatus of the present invention may further provide a rear tray under the circuit board in the other section of the housing. The rear tray may also guide the inner fiber drawn from the one section so as to head to the one section again. The rear tray may also provide a plurality of eaves to prevent the inner fiber set therein from straying out.

The one section of the housing of the present communication apparatus may provide a plurality of terraces for mounting the optical components thereon, where the terraces may form a plurality of grooves to set the inner fibers therein; and the other section of the housing may also provide a plurality of terraces whose outer periphery may define a bent curvature of the inner fibers. The terraces in the other section may come in contact with the circuit mounted on the circuit board to secure a heat dissipating path from the circuit to the housing.

The grooves formed in the terraces of the one section may provide two pairs, the first pair of which has a distance between the grooves substantially equal to a distance between two fibers in the SC-type optical receptacle; while, the second pair of grooves has another distance therebetween which is substantially equal to a distance between two fibers in the LC-type optical receptacle. Accordingly, when the optical receptacle of the present communication apparatus is the SC-type, the inner fibers drawn from the optical receptacle may be set in the first pair of grooves, while, when the LC-type optical receptacle is installed, the second pair of the grooves may receive the inner fibers drawn from the optical receptacle.

The housing of the present optical communication apparatus may provide an area to mount the optical receptacle thereon. The area may be partitioned from the one section by the rear wall and the side walls. The optical receptacle may be mounted in this area as putting an electrically conductive sheet between the rear of the optical receptacle and the rear wall, which may shield the one section and the other section from the exterior effectively.

Another aspect of the present invention relates to a method to assemble the optical communication apparatus. The apparatus comprises the optical components, the electrical components, a plurality of inner fibers, and a housing. The optical components include an optical receptacle, an optical unit, and a plurality of OSAs, while, the electrical components include an electronic circuit mounted on a circuit board. The inner fibers each couples one of the OSAs with the optical unit; and the housing installs these optical components only in the one section and, electrical components in only in the other section different from the one section, and the inner fibers. The method of the invention may comprise steps of: (a) installing the optical unit within the housing, (b) arranging the inner fibers extended from the optical unit; (c) installing the circuit board, which is assembled with OSAs, into the housing so as to cover the inner fibers; and (d) coupling the OSAs optically with the inner fibers.

One feature of the present method is that the inner fibers may be optically coupled with the OSAs after arranging the inner fibers within the housing and installing the OSAs into the housing. The step of arranging the inner fibers may include steps of: (b-1) setting the inner fibers in the grooves formed in one section of the housing, where the one section installs only the optical components; and (b-2) bending the inner fibers along a periphery of the terrace formed in the other section of the housing, where the other section installs only the electronic components. Moreover, the step of installing the circuit board may include step of: (c-1) covering the inner fibers set in the grooves and bent along the periphery by the circuit board.

In a modification, the step of arranging the inner fibers may include steps of: (b-1)' setting a rear tray in the other section of the housing; and (b-2)' bending the inner fibers with a curvature defined by the rear tray; and the step of installing the circuit board may include a step of: mounting the circuit board on the rear tray so as to cover the inner fibers set in the rear tray.

In the process of the invention, the step of arranging the inner fibers may include steps of: (b-1) covering the inner fibers by a front tray and a latch unit to be mounted in the one section of the housing, (b-2) guiding each of the inner fibers in one of slots of the front tray; and the step of installing the circuit board may include steps of (c-1) coupling the inner connector attached to an end of the inner fiber with the front tray, (c-2) setting the inner connector in a retreated position, (c-3) mounting the latch unit in the one section of the housing, and (c-4) installing the OSAs assembled with the circuit board in advance on the latch unit; and the step of coupling the OSAs with the inner fibers may include step of setting the inner connector in a coupling position.

Still another aspect of the present invention relates to an optical transceiver that comprises an OSA, an inner fiber that provides in one end thereof, a ferrule, an elastic member and a flange, a tray to guide the inner fiber, and an inner connector. The inner connector of the present optical transceiver, which receives the one end of the inner fiber, is assembled with a stopper to hold the elastic member within the inner connector, is movably supported by the tray, and is engaged with the OSA through the latch unit. A feature of the present optical transceiver is that the inner connector is movable between a retreated position and a coupled position. In the coupled position, the ferrule may be optically coupled with the OSA, while, the inner connector does not interfere with an installation of the latch unit pre-assembled with the OSA at the retreated position.

The inner connector of the invention may provide a groove to receive a latch finger of the tray, where the groove may provide projection to determine the retreated position and the coupled position. In an example, the groove may provide two projections, and the retreated position may be determined between the deeper side projection and the end wall of the groove, while, the coupled position may be set between two projections. In another example, when the groove provides three projections, the retreated position may be set between the deepest projection and the end wall, while, the coupled position may be determined between the shallower two projections.

The inner connector of the invention may provide the first portion to receive the inner fiber, the second portion to receive the elastic member and the flange, and a partition wall to divide the first and second portions. The elastic member may be set between the partition wall and the flange; accordingly, the ferrule is pushed out from the stopper.

Still another aspect of the present invention relates to an optical transceiver that comprises a resin made optical receptacle, a housing and an electrically conductive sheet. The optical receptacle may include a sleeve assembly to output an inner fiber with the pig-tailed arrangement. The housing provides an area to install the optical receptacle thereon. This area may be surrounded by the side walls and the rear wall. The conductive sheet may be put between the optical receptacle and the rear wall.

The sleeve assembly may further include first and second cylinders, and a flange between the cylinders. The inner fiber is output from the second cylinder in the pig-tailed arrangement. The first cylinder protrudes into a cavity of the optical receptacle by passing through the conductive sheet. The optical receptacle may provide a rear wall, which pushes the conductive sheet against the rear wall of the housing, with a step to receive the flange of the sleeve assembly. The housing may further provide a face cover to push the optical receptacle against the rear wall of the housing as sandwiching the conductive sheet.

A feature of the optical receptacle is that it may provide a lug in respective sides thereof, while, the side wall of the housing may provide a pocket that receives the lug. The lug is attached to the side of the receptacle in one end thereof, and bent vertically from the attached portion. The bent portion may be elastically rotate around the attached portion, which may further push the conductive sheet against the rear wall of the housing. The lugs in both sides of the optical receptacle may be diagonally formed, and the pockets in respective side walls may be also diagonally formed. The lug may provide a rib crushable by abutting against the wall of the pocket. The conductive sheet may be a non-woven fabric, or may be made of rubber coated with an electrically conductive material that comes in contact with the rear wall of the housing.

The rear wall of the housing may provide pair of double cuts. One of the paired cuts may have a pitch equal to a pitch between two optical axes of the SC-connector, while the other paired cuts may have another pitch equal to a pitch between two optical axes of the LC-connector. The optical receptacle of the present invention may be applicable to the SC-type optical connector and the LC-type optical connector.

The optical receptacle may provide a plurality of bosses in the rear wall thereof. The bosses may abut against the conductive, thus, the conductive sheet may securely come in contact with the rear wall of the housing. The bosses may be provided in whole outer surface of the optical receptacle. When the housing of the present optical transceiver comprises an upper housing and a lower housing, where the optical receptacle is put between these housings, the bosses in the outer surface of the receptacle housing may come in contact with the upper and lower housings, which may effectively and reliably shield the optical transceiver.

Moreover, the optical transceiver of the present invention may provide a shield gasket put between the upper and lower housings, in particular, the shield gasket may be put on the side walls and rear walls formed in lower housing so as to surround the area where the optical receptacle is mounted. The shield gasket may not only come in contact with the upper and lower housings, but in contact with the conductive sheet between the rear of the optical receptacle and the rear wall, which may shield the optical transceiver in further effective and reliable.

According to another aspect of the optical transceiver of the present invention, the optical transceiver comprises a plurality of OSAs, a circuit board, a plug board, and a housing. The circuit board mounts an electronic circuit coupled with the OSAs thereon. The plug board provides an electronic plug which mates with the host connector. The plug is electrically connected with the circuit through an electrical connector set between the plug board and the circuit board. A feature of the optical transceiver of the invention is that the plug board is rigidly supported by the housing; while, the circuit board is softly supported by the housing. The housing may comprise the upper housing and the lower housing, where the plug board is put between the upper and lower housings, and the circuit board is also put between the upper and lower housings but through gaskets.

The plug board may provide a rib in both top and back surfaces thereof, while the upper and lower housings each provides a groove to receive the rib in the plug board. A metal cover, whose shape may trace the shape of the rib, may be interposed between the rib and the groove. The metal cover may provide a plurality of legs and fins each coming in contact with and pushing the walls of the groove. Thus, the plug board may be rigidly supported by the upper and lower housings.

On the other hand, the circuit board may provide ground patterns in side portions of top and back surfaces thereof. The baskets may come in contact with the ground pattern. The ground patterns in the front and back surfaces formed in the same side portion of the circuit board may be connected with a via holes or an enveloping pattern covering the edge of the circuit board, which may effectively shield the circuit mounted on the circuit board. The upper and lower housings may provide a groove in a side portion thereof to receive respective gaskets. In a modification, the gasket may be a U-shaped metal member with a slab portion and a pair of legs. The slab portion may envelope the edge of the circuit board, while, the legs may provide fins that come in contact with the upper and lower housings. Even the gasket has the arrangement above described, the upper and lower housings may softly put the circuit board therebetween, and effectively shield accompanied with the gasket, the circuit on the circuit board.

Still another aspect of the present invention relates to a pluggable optical transceiver that is plugged with the host system and have a distinguishable feature that the optical transceiver may be prevented from being released from the host system when the optical transceiver receives the external connector in the optical receptacle thereof, and, in addition to the specific function described above, the optical transceiver of the present invention may be also prevented from receiving the external connector when the optical transceiver is free from the host system, that is, when the optical transceiver is not plugged with the host system.

The optical transceiver of the invention comprises an optical receptacle to receive the external connector, a screw latch to engage the optical transceiver with the host system, a latch bar to show the mechanism described above and a housing to install the optical receptacle, the screw latch and the latch bar. That is, the latch bar may protrude in one end thereof into the optical receptacle when the optical receptacle is vacant, while, the screw latch may provide a groove to receive another end of the latch bar.

In an original position of the optical transceiver, where the optical transceiver is free from the host system, the screw latch pushes the other end of the latch bar, accordingly, the one end of the latch bar may protrude into the optical receptacle, where the optical receptacle is prevented from receiving the external optical connector. When the optical transceiver is engaged with the host system by fastening the screw latch to the host connector, the other end of the latch bar may align with the groove of the screw latch, which makes a rest space to receive the other end of the latch bar. Inserting the external connector into the optical receptacle, the external connector may push the one end of the latch bar and the other end of the latch bar may be set within the groove of the screw latch. Thus, the external connector may be engaged with the optical receptacle only when the optical transceiver is plugged with the host system. Moreover, because the other end of the latch bar is received in the groove of the screw latch, the screw latch may be prevented from disengaging with the host connector by the latch bar operating as a stopper, the optical transceiver may be prevented from being released from the host system.

The latch bar may provide an elastic portion, while the housing may provide a space to receive the elastic portion therein. The latch bar may automatically recover the original position thereof by the elastic force caused by operation of the elastic portion within the space. Moreover, the optical receptacle may provide a cut to pass the one end of the latch bar. The latch bar may protrude into the optical receptacle through the cut.

Still another aspect of the present invention relates to a connector assembly to be set within a pluggable optical transceiver. The connector assembly may comprise a latch unit, an inner fiber, and a connector housing. The latch unit supports the OSA and includes a pair of latch fingers. The inner fiber has, in an end portion thereof, a ferrule, a flange, and a coil spring with an end abutting against the flange. The connector housing may comprise first and second spaces, and a center partition that distinguishes said first space from said second space. The first space receives the end portion of the inner fiber as the other end of the coil spring abuts against the center partition. The second space secures the inner fiber continuous to the end portion. A feature of the connector assembly of the present invention is that the first space of the connector housing is engaged with the latch finer of the latch unit to couple the inner fiber optically with the OSA. The first space of the connector housing may provide a pair of side latches each supported by the center partition. The side latch may have a U-shaped cross section within which the latch finger of the lath unit may be secured to engage therewith.

The connector assembly of the invention may further provide a ferrule stopper that is supported by the connector housing so as to put the ferrule, the flange, and the coil spring between the ferrule stopper and the center partition. Thus, the inner fiber and the connector housing may be prevented from disassembling. The ferrule stopper may provide a beam and a pair of legs each extending from the beam so as to form the U-shaped cross section. The beam may have an opening through which the ferrule passes, and the flange in a root of the ferrule may abut against the beam. The legs may provide a tab to be latched with the connector housing. Accordingly, the ferrule, the flange, and the coil spring may be prevented from disassembling with the connector housing.

BRIEF DESCRIPTION OF THE DRAWINGS

The foregoing and other purposes, aspects and advantages will be better understood from the following detailed description of a preferred embodiment of the invention with reference to the drawings, in which:

FIG. 4A shows the inside of the first housing, while.

FIG. 15A shows the inner connector viewed from the rear, while.

FIGS. 30A and 30B are a cross section and a front view, respectively, of the latch bar and the screw latch when the optical receptacle is free from the external connector, while.

FIG. 33A shows a process when the inner connector in a position able to couple with the OSAs, while.

DESCRIPTION OF THE PREFERRED EMBODIMENTS

Next, some preferred embodiments according to the present invention will be described as referring to accompanying drawings. In the description of the drawings, the same numerals or symbols will refer to the same elements without overlapping explanations.

First Embodiment

Figure 1A:
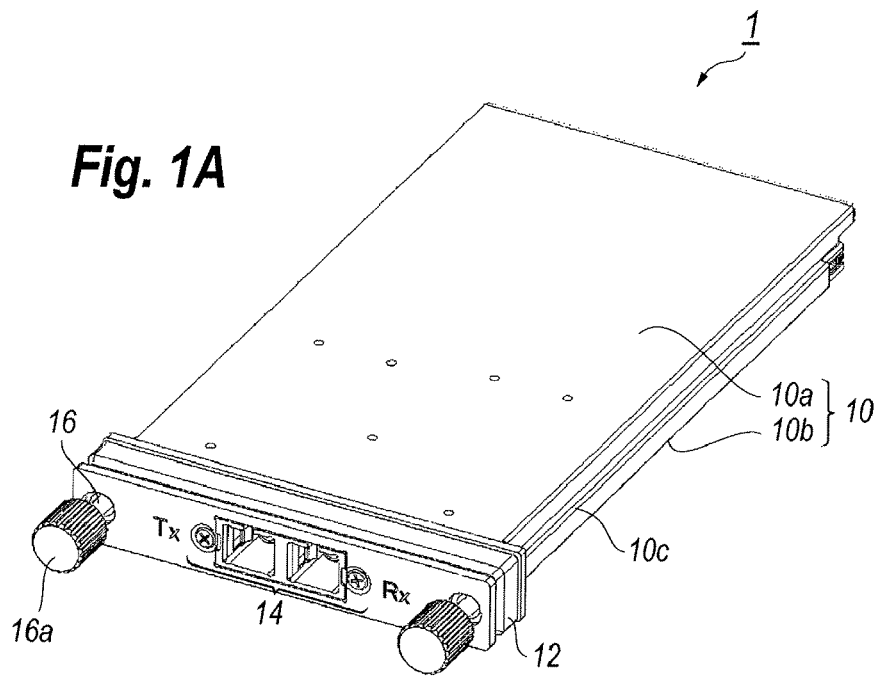
FIGS. 1A and 1B show an optical transceiver according to an embodiment of the present invention, where FIG. 1A views the optical transceiver from upper front, while, FIG. 1B views the optical transceiver from rear bottom.
Figure 1B:
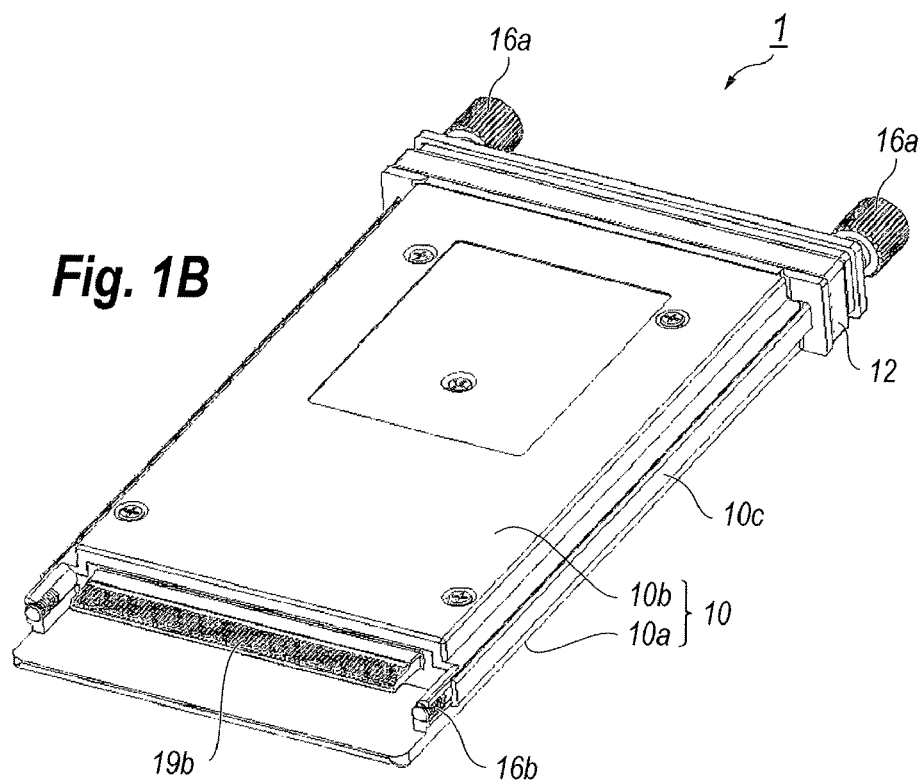
Figure 3:
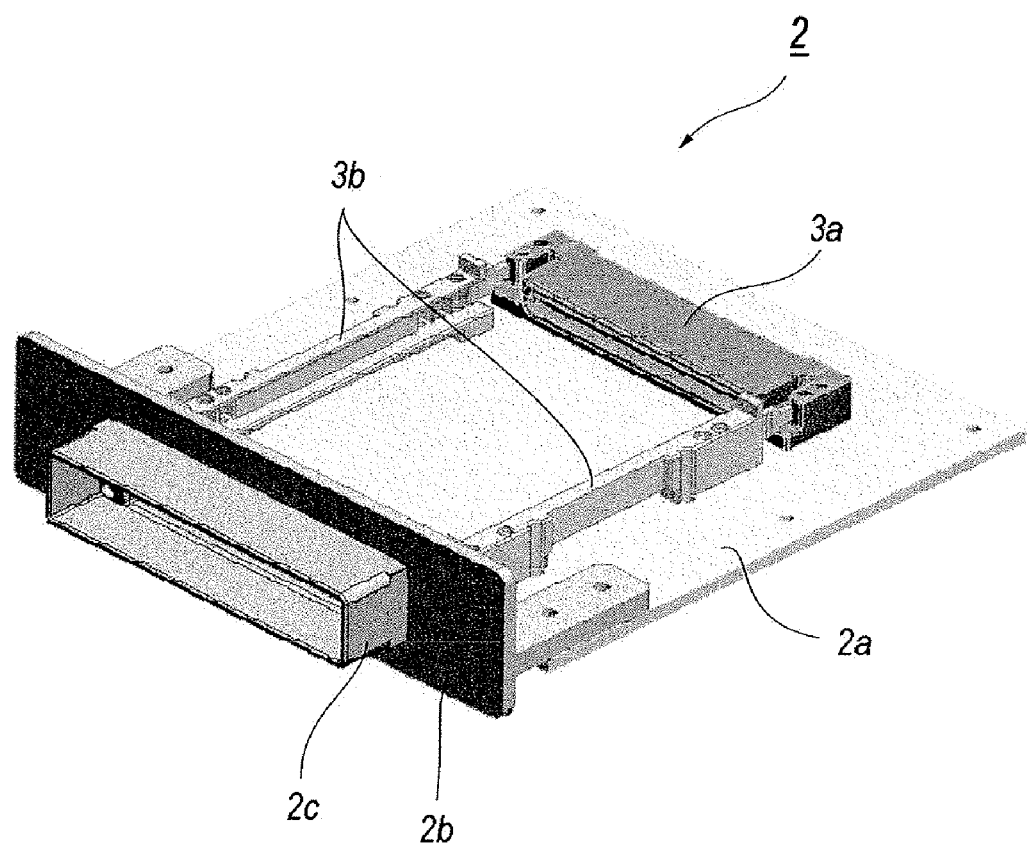
FIG. 3 views a host system to which the optical transceiver shown in FIG. 1 is to be mounted.

FIGS. 1A and 1B are perspective views of an optical transceiver 1 according to an embodiment of the present invention, where FIG. 1A views the optical transceiver 1 from upper front, while FIG. 1B views the transceiver from rear bottom. In the description presented below, the front side corresponds to a side where an optical receptacle 14 is implemented, the rear side corresponds to a side where an electrical plug 19b is installed, the upper or the top corresponds to a side where the first housing 10a is installed with respect to the second housing 10b, and the lower or the bottom corresponds to the side the second housing 10b is implemented. FIG. 3 illustrates the host system on which the optical transceiver 1 is to be mounted. The host system 2 typically provides the system board 2a, where a pair of rails 3b and the host connector 3a is mounted. The face panel 2b with a port 2c is provided in the host board 2a. The optical transceiver 1 of the present invention may be pluggable with the host connector 3a by inserting it from the port 2c.

Figure 2:
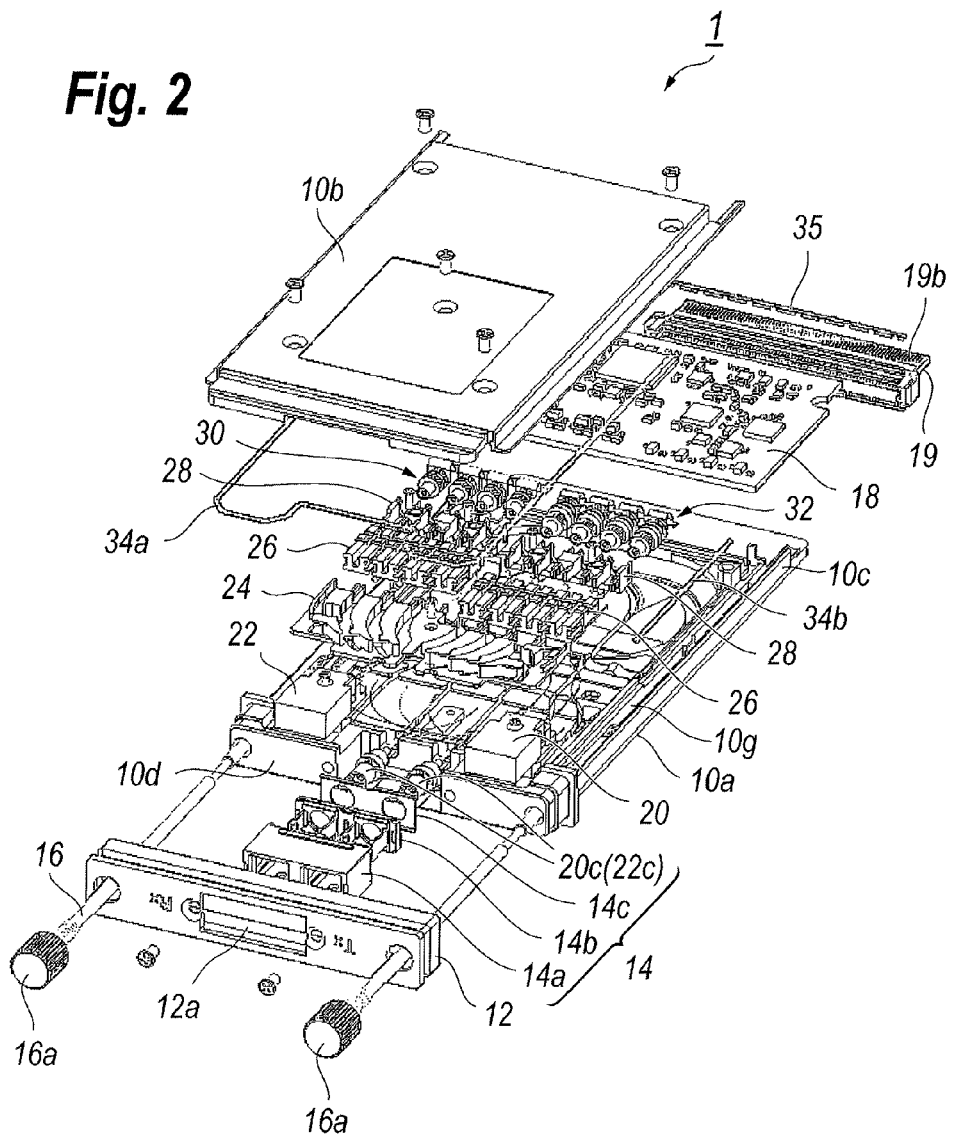
FIG. 2 is an exploded view of the optical transceiver.

The optical transceiver 1 illustrated in FIGS. 1 and 2 provides a housing 10 with a size of 128×72×14 mm$^3$, which is decided by a multi-source agreement concerning to, what is called as, the CFP transceiver. The housing 10 of the embodiment is made of metal.

The optical transceiver 1 provides a face cover 12 in the front end of the housing 10. An optical receptacle 14 is assembled in a center portion of the face cover 12 with screws. The housing 10 also provides a pair of screw latches 16 in both ends of the face cover 12. Front end of the screw latch 16 provides a knob 16a extended from the face cover 12, while the rear end of the screw latch 16 is formed with a thread 16b. This thread 16b is to be fastened with a tapped hole provided in respective sides of an electrical connector 3a prepared in the host system 2; thus, the optical transceiver 1 is to be fixed to the host system 2.

The housing 10 further provides ribs 10c in respective sides thereof. The rib 10c provides a space 10g through which the screw latch 16 passes. The rib 10c has a function to guide the optical transceiver 1 along the rails 3b prepared in the host system 2, which facilitates the installation of the optical transceiver 1 on the host system 2 and the engagement of the electrical plug 19b with the electrical connector 3a of the host system. The electrical plug 19b according to the embodiment provides electrical pads, the count of which exceeds a hundred and forty (140) within a full width of 72 mm of the optical transceiver 1, then a pitch between the electrical pads become less than one millimeter. Accordingly, an alignment mechanism like the rib 10c and the rail 3b is preferable or inevitable for the engagement of the electrical plug 19b with the electrical connector 3a.

FIG. 2 is an exploded view of the optical transceiver 1 shown in FIGS. 1A and 1B. FIG. 2 views the optical transceiver 1 from front bottom. The housing 10 comprises the upper housing 10a, which is called as the first housing, and the lower housing 10b, which is called as the second housing. A plurality of optical and electrical components is installed within a space formed by two housings, 10a and 10b. The optical transceiver 1 comprises the optical receptacle 14, an optical multiplexer 20, an optical demultiplexer 22, a front tray 24, two sets of inner connector 26 and latch unit 28, four (4) ROSAs 30, four (4) TOSAs 32, a circuit board 18, and a plug board 19. Next, respective components will be roughly described.

Figure 4A:
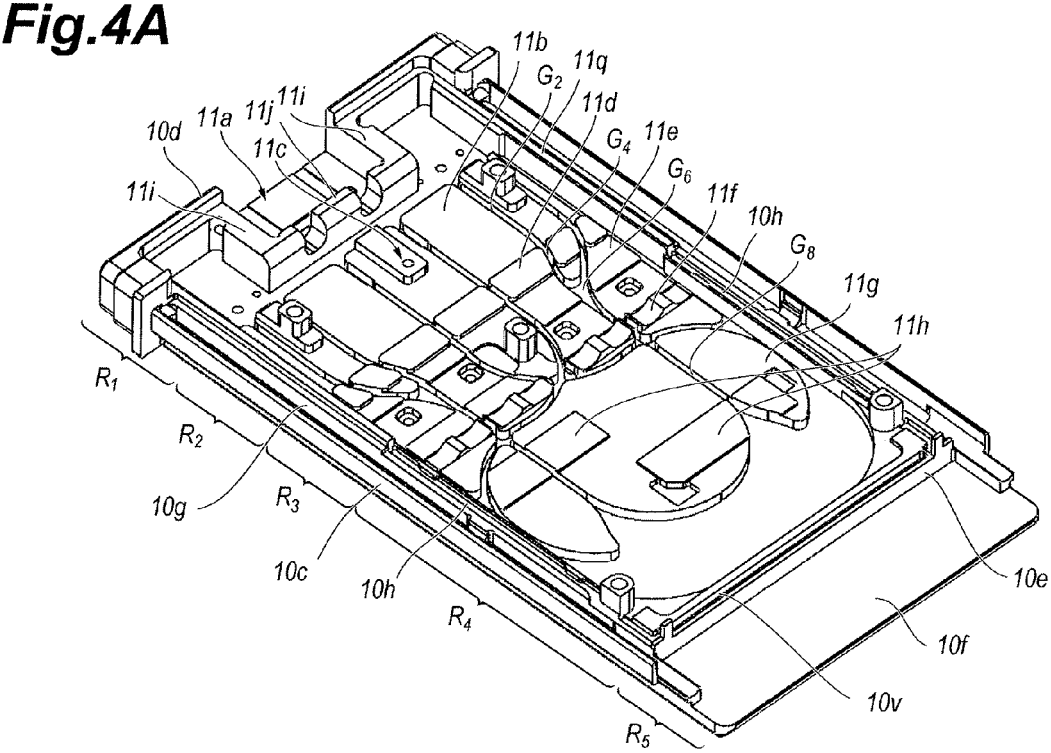
Figure 4B:
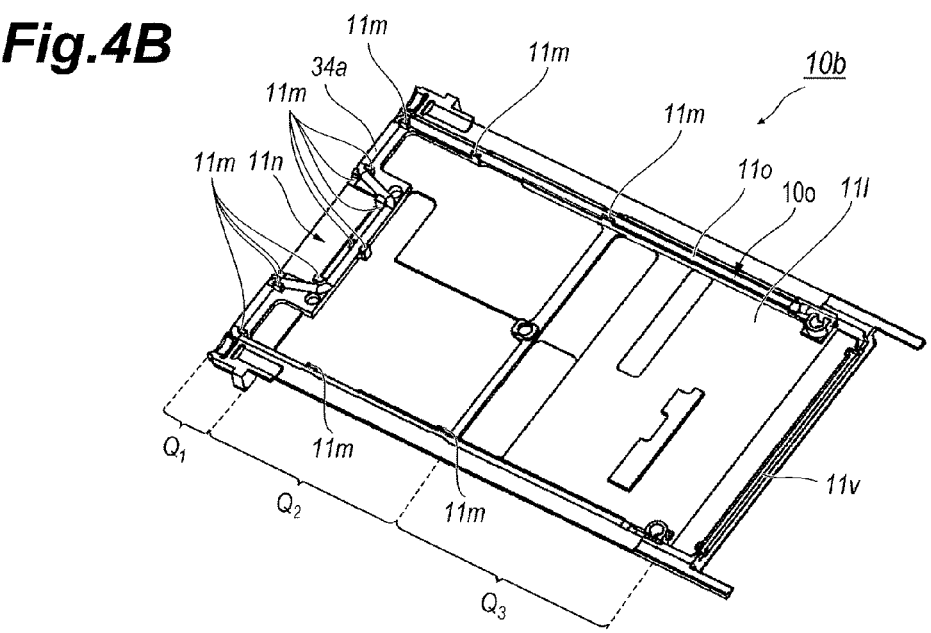
FIG. 4B shows the inside of the second housing.

FIG. 4A shows the inner structure of the first housing 10a, and FIG. 4B shows the inside of the second housing 10b.

Referring to FIG. 4A, the inside of the first housing 10a is divided into five (5) sections, $R_1$ to $R_5$. The first section $R_1$, which positions in the front end of the first housing 10a, mounts the optical receptacle 14 and two optical components of the optical multiplexer 20, and the optical demultiplexer 22 in respective sides of the optical receptacle 14. The second section $R_2$ next to the first section $R_1$ mounts the front tray 24. The third section $R_3$ next to the second section $R_2$ mounts the inner connectors 26 and the latch unit 28. The fourth section $R_4$ next to the third section $R_3$ mounts the circuit board 18 for the electronic circuit, and the fifth section $R_5$ mounts the plug board 19 for the electronic plug 19b. The ROSAs 30 and the TOSAs 32 are set in the rear end of the third section $R_3$.

In the present optical transceiver 1, only the fourth section $R_4$ installs the electronic components, and the other sections, $R_1$ to $R_3$, mount the optical components. The plug board 19 is protected with the rear end 10f of the first housing 10a as a ceiling. Thus, the optical transceiver 1 of the present embodiment clearly distinguishes the sections that mount the optical components from the section that installs the electronic components. Moreover, the optical coupling between the OSAs, 30 and 32, and the inner fibers are carried out through the inner connector 26 and the latch unit 28 without using any fiber splicing.

Referring to FIG. 4A, the inside of the first housing 10a provides a plurality of complex structures. A center of the first section $R_1$, provides an area 11a to mount the optical receptacle 14. Both sides of the center area 11a are prepared for mounting the optical multiplexer 20 and the optical demultiplexer 22. Two optical components, 20 and 22, are set in respective area by screws.

The second section $R_2$ is prepared for mounting the front tray 24. The second section $R_2$ is thicker than the first section $R_1$ so as to form the terrace 11b. The terrace 11b provides a plurality of grooves $G_2$, and six grooves $G_2$ are formed in the present embodiment, within which the inner fibers for connecting the optical receptacle 14 with the optical multiplexer 20 and the optical demultiplexer 22, those for connecting the optical multiplexer 20 with the TOSAs 32, and those for connecting the optical demultiplexer 22 with the ROSAs 30, are guided and set.

The front tray 24 is fixed on the terrace 11b with a screw by screwing it in the center hole 11c. The both sides of the terrace 11b provide a screw hole to fix the second housing 10b to the first housing 10a.

The inner connectors 24 are mounted in a front end of the third section $R_3$, where a terrace 11d is formed. This terrace 11d provides six grooves $G_4$ continuous to the former groves $G_2$ in the second section $R_2$. Mounting the front tray 24 and the inner connectors 26 in respective regular positions, the inner fibers secured in the grooves $G_2$ and $G_3$ are hidden by these components, 24 and 26, which may prevent the inner fibers from straying out from the grooves, $G_2$ and $G_4$.

The rear side of the third section $G_3$ mounts the latch unit 28. The terrace 11d in the third section $R_3$ continues to a terrace 11e in the third section $R_3$. Moreover, the grooves $G_4$ in the front side of the third section $R_3$ also continue to the grooves $G_6$ of the third section $R_3$. However, the count of the grooves $G_6$ reduces to four (4) by unifying outer two grooves into the single groove. The rear end of the third section $G_3$ provides a plurality of saddles 11f to mount the OSAs, 30 and 32, whose shape corresponds to the outer shape of the stem of the OSAs, 30 and 32. The OSAs, 30 and 32, may be mounted on these saddles 11f so as to put a thermal sheet between the stem and the saddle 11f, and to set the flange thereof in the latch unit 28. Then, fixing the latch unit 28 to the first housing 10a by the screws, the OSAs, 30 and 32, are aligned with the first housing 10a.

The forth section $R_4$ also provides still another terrace 11g and grooves $G_8$ that are continuous to the former grooves $G_6$. The inner fibers set in the groves $G_8$ turn in the forth section $R_4$ and head to respective target components. Accordingly, the terrace 11g has a curved plane shape defining the curvature of the inner fiber. This terrace 11g provides a plurality of double terraces in positions facing the IC on the circuit board 18, for instance, a driver circuit to drive the light-emitting device in the transmitter unit and a clock and data recovery circuit in the receiver unit. Theses ICs, as already described, consume large power among components on the circuit board 18. The heat generated in these ICs is effectively dissipated to the first housing 10a through the double terraces, 11g and 11h. The double terrace 11h may come in contact with the ICs directly or indirectly through a thermal sheet.

FIG. 4B is a perspective view showing the inside of the second housing 11b and the gasket 34a attached thereto according to an embodiment of the invention. The second housing 11b includes first to three sections, $Q_1$ to $Q_3$, and an area 11n where the optical receptacle 14 is to be mounted thereon. The first section $Q_1$ corresponds to the first section $R_1$, the second section $Q_2$ corresponds to the second and third sections, $R_2$ and $R_3$, and the third section $Q_3$ corresponds to the fourth section $R_4$ of the first housing 10a.

The gasket 34a runs in both side ends in the first to third sections, $Q_1$ to $Q_3$, in the front end of the first section $Q_1$, and the rear end of the center area 11n. The second housing 11b, as shown in FIG. 4B, provides a plurality of bosses 11m in an inner side of a path along which the gasket 34a runs. The boss 11m may temporarily set the gasket 34a during the assembly of the optical transceiver 1. The second housing 10b may provide, instead of the boss 11m, a tiny wall along the inner side of the side wall 11o. The tiny wall may also prevent the gasket from scattering during the assembly of the optical transceiver 1.

The optical receptacle 14 receives an external optical connector, which is not illustrated in FIGS. 1 to 4, and optically couples external fibers in the external connector with the optical devices in the optical transceiver 1 to carry out the full-duplex and wavelength division multiplexed optical communication. Referring to FIG. 2, the optical receptacle 14 comprises a housing 14a, a sleeve holder 14b, a conductive sheet 14c and two sleeves, 20c and 22c. The optical receptacle 14 is set in a front center space 11d formed by two housings, 10a and 10b.

The face panel 12 provides an optical port 12a in a center thereof. The face panel 12 is fixed to the front wall 10d of the first housing 10 with screws, which exposed two cavities of the optical receptacle 14 in the optical port 12a. The optical receptacle 14 is put between not only two housings, 10a and 10b, but between the face panel 12 and the rear wall 11j in the rear side of the center space 11a accompanied with the sleeve holder 14b, the conductive sheet 14, and the sleeves, 20c and 22c. The receptacle housing 14a provides two cavities into which the sleeves, 20c and 22c and a pair of latch fingers of the sleeve holder 14b protrude. The physical dimensions of the latch finger and the sleeves, 20c and 22c, obey the standard of the, what is called as, the SC connector in this embodiment. An inner fiber is extended from the end of the sleeves, 20c and 22c, by the pig-tailed arrangement; specifically, the pig-tailed fiber is extracted from the sleeve through the U-shaped or the semi-circular cut formed in the rear wall of the space. The conductive sheet 14c is put between the rear wall 11j and the flange of the sleeve 20c to eliminate the leakage of the electro-magnetic radiation from the inside of the optical transceiver 1.

The optical multiplexer 20 and the optical demultiplexer 22 are mounted in respective sides of the optical receptacle 14. The optical multiplexer 20 multiplexes four (4) optical signals each having a specific wavelength different from others and being emitted from respective TOSAs 32. While, the optical demultiplexer 22 divides an optical signal provided from the external fiber into four (4) optical signals each having different wavelengths from others and provides these optical signals to respective ROSAs 30.

Two inner fibers each extracted from respective sleeves, 20c and 22c, enter the optical multiplexer 20 and the optical demultiplexer 22 from the rear side thereof after wired in the housing 10. The connection of these two inner fibers with the optical multiplexer 20 and the optical demultiplexer 22 is also the pit-tailed configuration. As described later, the optical transceiver 1 according to the embodiment provides four inner fibers connecting the optical multiplexer 20 with four TOSAs 32, and other four inner fibers connecting the optical demultiplexer 22 with four ROSAs 30. Thus, total 8 inner fibers are wired within the housing 10 as being guided by the front tray 24.

The front tray 24 may guide four inner fibers drawn from the optical multiplexer 20 to the TOSAs 32, and other four inner fibers drawn from the optical demultiplexer 22 to the ROSAs 30. The optical transceiver 1 optically couples plural optical components in the housing 10 thereof. Accordingly, the processing of surplus lengths of the inner fibers is a subject to enhance the productivity of the optical transceiver 1. The front tray 24 in the housing 10 may orderly arrange the lengthened inner fibers. Moreover, the first housing 10a may be made of metal die-casting and has an enough thickness to form grooves to guide the optical fiber therein. By arranging the lengthened inner fibers in the grooves and by the front tray 24, the productivity of the optical transceiver 1, in particular, the assembling time may be shortened and the possibility to cause the damage on the inner fiber may be reduced.

Two sets of inner connectors 26 are provided in the rear side of the front tray 24. One set of inner connectors 26 is coupled with inner fibers drawn from the optical demultiplexer 22 to the ROSA 30, while the other set of the inner connectors 26 is coupled with the other inner fibers drawn from the optical multiplexer 20 to the TOSA 32. The number of inner connectors corresponds to the number of the ROSAs 30 and the TOSAs 32, and may be separable so as to mate with respective ROSAs 30 and TOSAs 32. The inner connectors 26 may be individually operable.

As described later in the specification, surplus lengths of the inner fibers are set in the front tray 24 and in the grooves formed in the housing 10 during the assembly of the optical transceiver 1, and the inner connectors 26 are temporarily mated with fingers of the front tray 24. Setting the ROSAs 30 and the TOSAs 32 accompanied with latch unit 28 on the housing 10a, the latch unit 28 faces the inner connectors 26. Then, sliding the inner connectors 26 rearward to latch the inner connectors 26 with respective latch units 28, the inner fibers drawn from the optical multiplexer 20 may couple with the TOSAs 32, and the other inner fiber drawn from the optical demultiplexer 22 may couple with the ROSAs 30. Thus, the optical coupling between the OSAs, 30 and 32, and the external fiber may be realized through the coupling mechanism of the inner connectors 26 and the latch unit 28. Accordingly, even when only one of OSAs, 30 and 32, causes a failure, this troubled OSA may be easily and promptly replaced only by releasing only one of the inner connectors 26 corresponding to the troubled optical subassembly from the latch unit 28.

The optical transceiver 1 of the embodiment installs the circuit board 18 and the plug board 19 in the rear of the OSAs, 30 and 32. The circuit board 18 installs a plurality of electrical components in both surfaces thereof, while, the plug board 18b installs the electrical plug 19b in the rear end thereof.

Electronic components include several ICs that show the large heat dissipation, for instance, a driver for an LD in the transmitter unit and a clock and data recovery in the receiver unit. To secure the heat conducting path from such ICs, the first housing 10a provides several terraces in the inner surface thereof to come in thermally contact with such ICs. The housings, 10a and 10b, provide a thick metal case formed by the die-casting, which shows large heat capacity, and the thick case makes it possible to form the mesa. Moreover, a depression between the mesas may show a function to guide the inner fibers therein.

The plug board 19 provided in the rear of the circuit board 18 mounts the electronic plug 19b. The present optical transceiver 1 may show the optical transmission speed of 40 Gbps or 100 Gbps by communicating with the host system in four (4) channels for the transmitter unit and other four (4) channels for the receiver unit. Then, each channel is necessary to transmit an electrical signal with the speed of 10 Gbps or 25 Gbps. Such an electrical signal with high speed is ordinarily handled in accordance with the LVDS (Low Voltage Differential Signal) standard. That is, each signal channel is necessary to have a pair of signal pins; then, total 16 pins are necessary to transmit electrical signals. Moreover, the transmission of the high speed signal is inevitable to reinforce the ground (GND) line. A pair of GND lines ordinarily sets the signal line therebetween to secure the signal quality. Still further, because the optical transceiver 1 installs 4 channels for the transmission and other 4 channels for the reception, the power consumption of the whole circuit becomes quite large and a plurality of power pins becomes necessary.

Accordingly, the present optical transceiver 1 provides the electronic plug 19b with over 140 pins within the full width of 72 mm, which inevitably reduces the pin pitch of the plug 19b to a distance less than 1 mm and requests the high dimensional accuracy to the circuit board 18. When such an electrical plug with the high dimensional accuracy is prepared in a large board, the circuit board 18 becomes cost ineffective. The present optical transceiver 1 divides the circuit board into two parts, one of which 18 has a large area and mounts the electronics circuit and the other 19 provides the electronic plug 19b in relatively smaller area.

Next, respective optical and electrical components installed in the optical transceiver 1 will be further described with modifications thereof.

Referring to FIGS. 2, 4A and 4B again, the optical transceiver 1 of the present embodiment may provide two gaskets, 34a and 34b, which have a rod shape and made of elastic member, typically, rubber tube with metal coating.

The gasket 34a runs, in the section $Q_1$ corresponding to the first section $R_1$, on the side wall and the walls defining the area 11n to mount the optical receptacle 14 therein as illustrated in FIG. 4B. In the section $Q_2$ corresponding to the second and third sections, $R_2$ and $R_3$, the gasket 34a runs on the side wall of the second housing 10b. In the section $Q_3$ corresponding to the forth section $R_4$, the gasket 34a is set in the groove 10o provided in the top of the side walls and runs along the ground pattern on the circuit board 18. The other gasket 34b is set in the groove 10h of the first housing 10a and runs along the other ground pattern provided in the back surface of the circuit board 18.

Assembling the first housing 10a with the second housing 10b, the first gasket 34a is put between the housings, 10a and 10b, in the first to third sections, $R_1$ to $R_3$; while in the fourth section $R_4$, the gasket 34a is put between the second housing 10b and the ground pattern on the surface of the circuit board 18, and the other gasket 34b is put between the first housing 10a and the other ground pattern in the back surface of the circuit board 18. This arrangement of the two gaskets, 34a and 34b, and the housings, 10a and 10b, may electrically shield the circuit on the circuit board 18 from not only the outside of the optical transceiver 1 but the area 11a where the optical receptacle 14 is mounted.

Figure 5A:
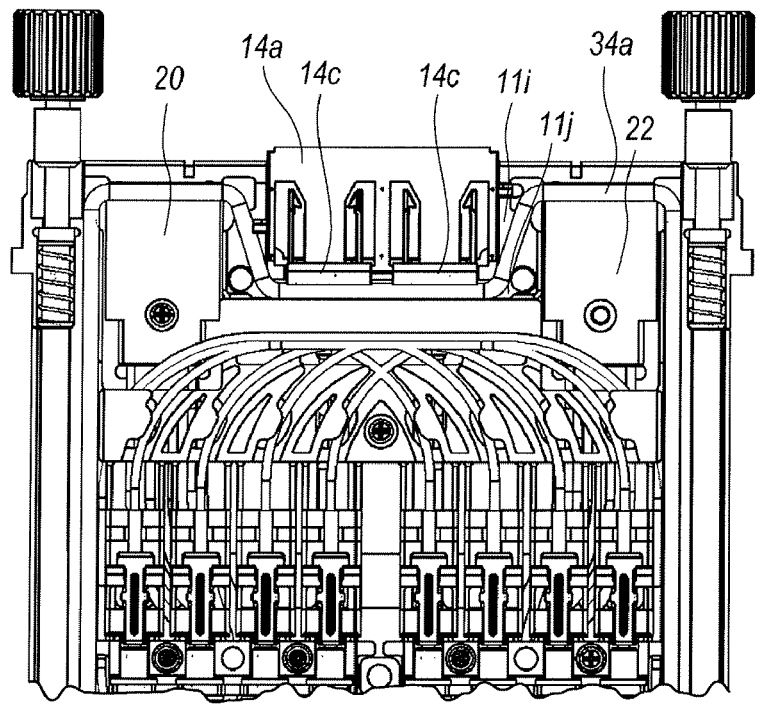
FIG. 5A magnifies a front portion of the inside of the optical transceiver.
Figure 5B:
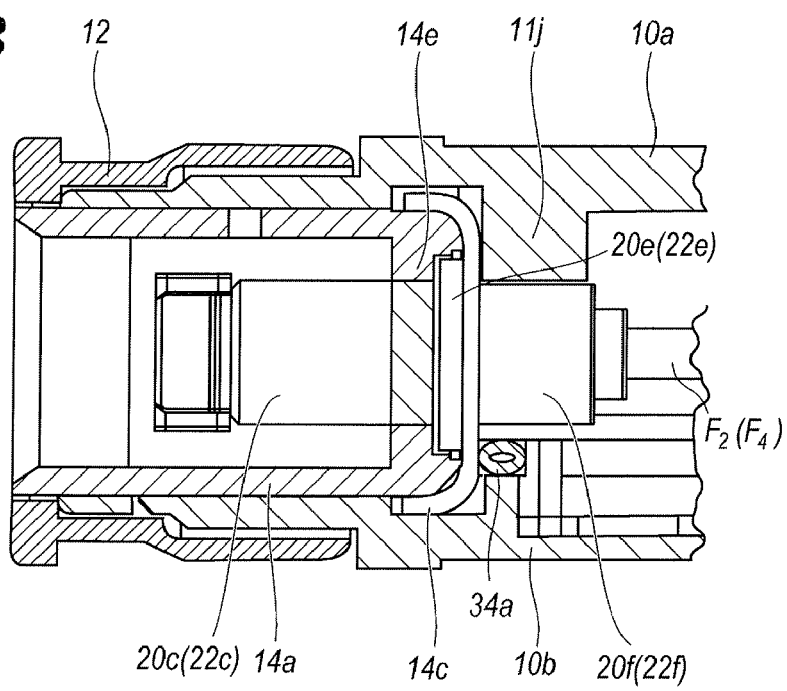
FIG. 5B is a cross section thereof.

FIGS. 5A and 5B magnify the front portion of the optical transceiver, where, FIG. 5A is a plan view and FIG. 5B is a cross section thereof. When the second housing 10b is assembled with the first housing 10a, the gasket 34a is held between two housings, 10a and 10b. Referring to FIG. 5A, the gasket 34a may run on the side walls 11i and the rear wall 11j of the first housing 10a so as to surround the center area 11a. Moreover, as shown in FIG. 5B, the gasket 34a may come in contact with the conductive sheet 14c put between the optical receptacle 14 and the rear wall 11j, which may securely shield the space 11a.

Figure 7A:
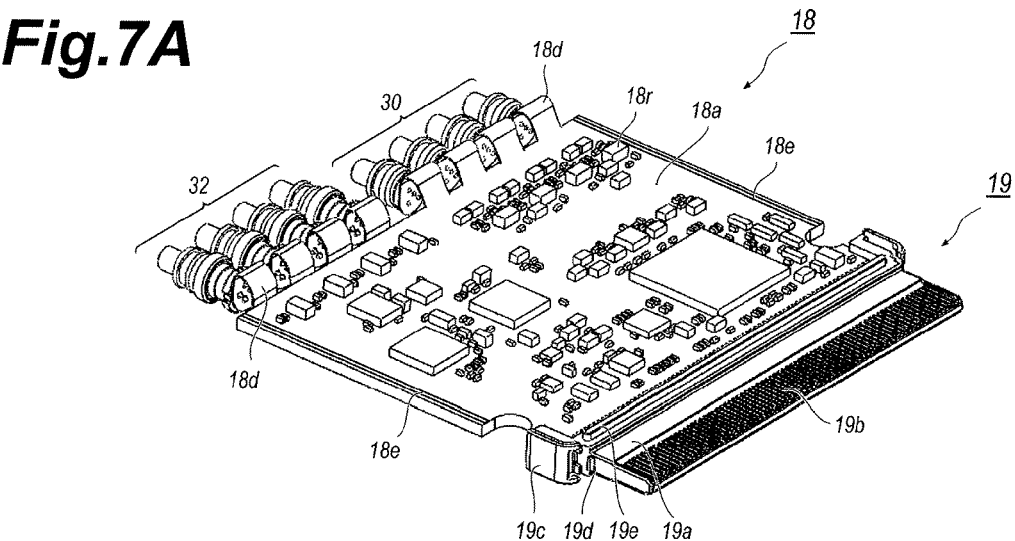
FIG. 7A is a perspective view showing the circuit board 18 and the plug board 19.
Figure 7B:
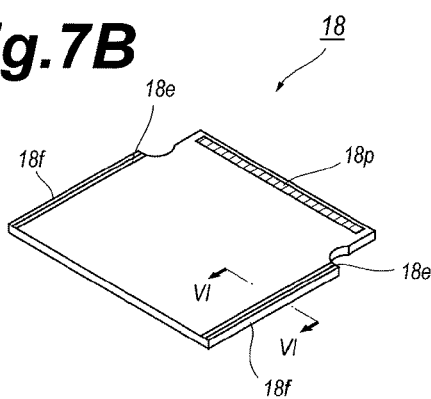
FIG. 7B shows the circuit board 18 without any components thereon.
Figure 7C:
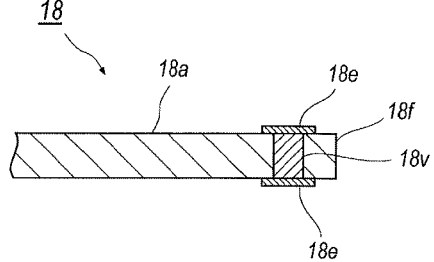
FIG. 7C shows a cross section of a side edge portion of the circuit board.
Figure 7D:
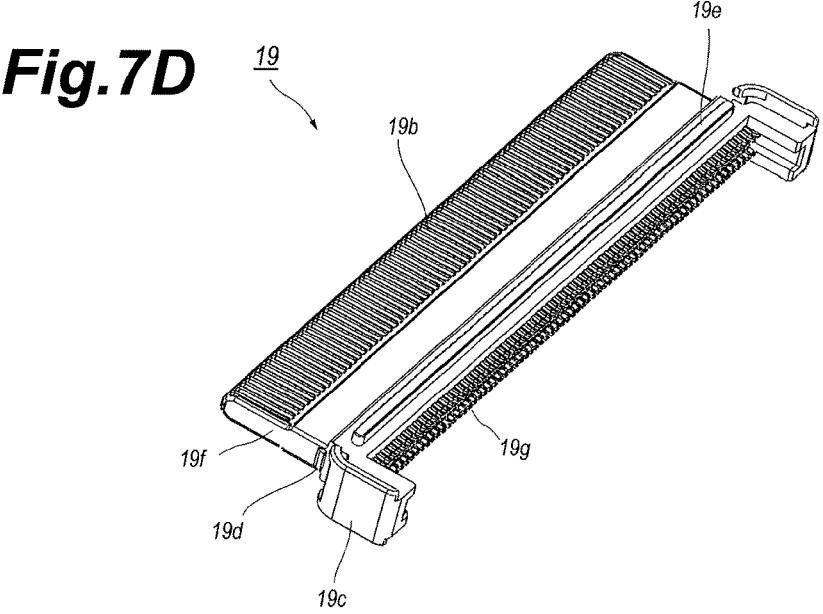
FIG. 7D shows the plug board 19.

The circuit board 18 will be further described. FIG. 7A is a perspective view showing the circuit board 18 and the plug board 19, FIG. 7B shows the circuit board 18 without any components thereon, FIG. 7C shows a cross section of a side edge portion of the circuit board, and FIG. 7D shows the plug board 19. The optical transceiver 1 according to the present embodiment, as already describe, divides boards for the electronic components into two parts, one of which is the circuit board 18 and the other is the plug board. Two boards, 18 and 19, are coupled with edge connector.

Figure 6A:
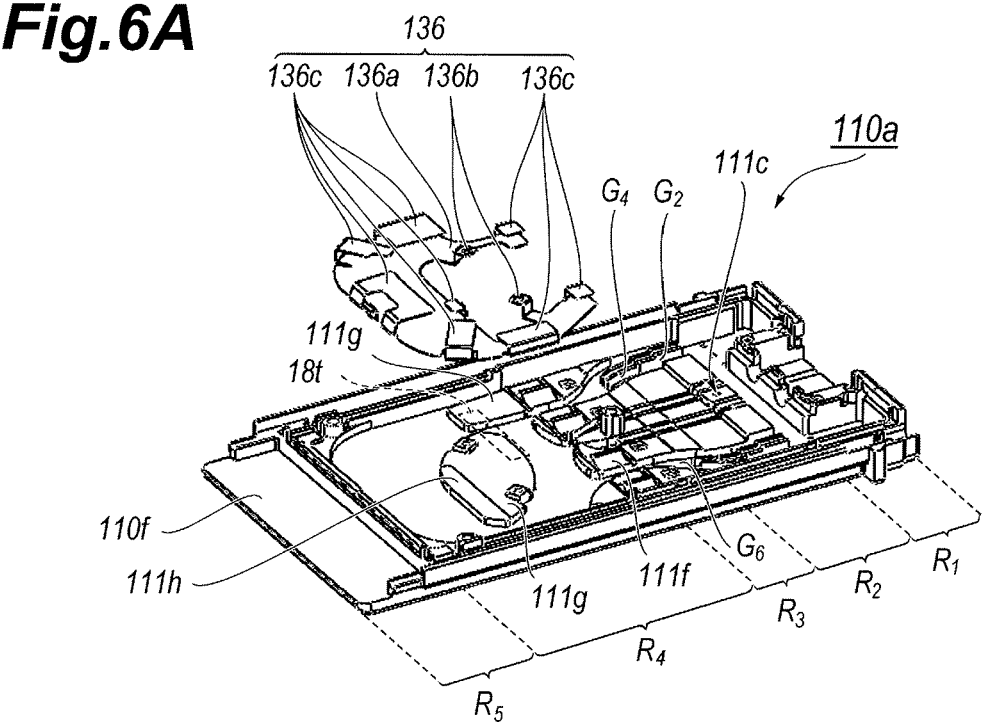
FIG. 6A illustrates another type of housing that mounts a rear tray.

The circuit board 18 mounts a plurality of electrical components. The ROSAs 30 are connected to the circuit board 18 in one surface thereof through respective FPC (flexible printed circuit board 18d; while, the TOSAs 32 are connected to the circuit board 18 in the other surface also through respective FPC boards 18d. This arrangement to distinguish the receiver unit from the transmitter unit by the surfaces thereof may reduce the electrical crosstalk between both units. The clock and data recovery ICs 18r are arranged in a side close to the ROSA 30 of the front surface of the circuit board 18, while, the driver ICs, which are not illustrated in FIG. 6A, are arranged in the side close to the TOSAs 32 but in the back surface. The arrangement of the CDR ICs 18r and that of the driver ICs make it possible for the optical transceiver 1 of the present embodiment to follow the transmission speed of 40 Gbps or 100 Gbps.

Figure 6B:
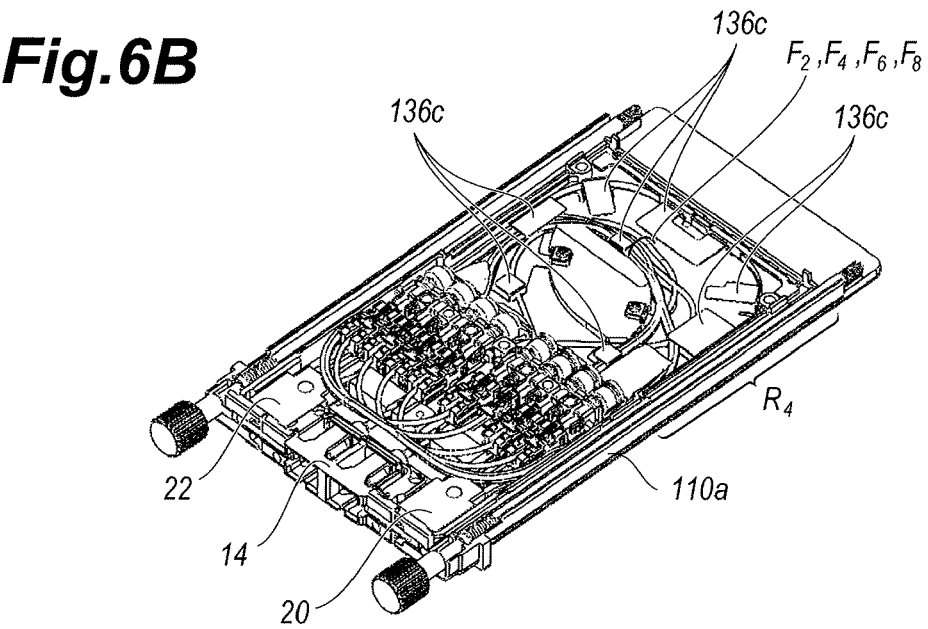
FIG. 6B shows the rear tray to which inner fibers are set.

FIG. 6A is a perspective view showing a first housing 110a according to another embodiment of the present invention, and FIG. 6B is a perspective view of the first housing 110a where whole optical components are installed therein. As illustrated in FIG. 6A, the first housing 110a omits the groove $G_8$ in the fourth section $R_4$; instead, the fourth section $R_4$ provides two terraces 111g. One of the terraces 111g is formed neighbor to the saddle 111f in the transmitter side, while the other 111g is formed in center of the section $R_4$ in the receiver side. These two terraces 111g provide an area for arranging the thermal sheet 18t, whose positions correspond to the position of the driver IC mounted on the circuit board 18. The terrace 111g forms the double terrace 111h to which the CDR IC mounted on the first board 18 comes in contact.

Other areas in the fourth section surrounding the terrace 111g, are formed in flat on which the rear tray 136 is mounted. The rear tray 136 may guide the inner fibers, $F_2$ to $F_8$, in the fourth section $R_4$. The rear tray 136 comprises a primary plate 136a, a fastened portion 136b, and a plurality of eaves 136c. The primary plate 136a has a shape substantially identical with the opened area in the fourth section $R_4$. The fastened portion 136b provides a hole aligned with the tapped hole in the terrace 111g. The rear tray 136 may be fixed to the first housing 110a by the screws. The eaves 136c may control the inner fibers, $F_2$ to $F_8$. Specifically, the eaves 136c each rise from the outer and inner edges of the primarily plate 136a and are bent inward. The inner fibers, $F_2$ to $F_8$, may be covered by the bent portion of the eaves 136c; thus, the inner fibers, $F_2$ to $F_8$, may be prevented from straying out. The surface of the eaves 136c may come in contact, directly or indirectly through a heat spreader, with the circuit board 18 to secure another heat conducting path from the circuit board 18 to the first housing 110a.

As shown in FIG. 7B, the circuit board 18 provides an edge connector 18p in one end thereof, where a plurality of electrical pads are included in the edge connector 18p. The circuit board 18 also provides edge portions 18f and a pair of ground patterns 18e along the respective edges 18f thereof. Although not shown in FIG. 7B, the back surface of the circuit board 18 also provides the ground pattern 18e in a position corresponding to the ground pattern 18e on the front surface 18a, and these ground patterns 18e are connected with through holes 18v as shown in FIG. 7C. The ground pattern 18e in the front surface 18a of the circuit board 18 electrically comes in contact with the second housing 10b through the gasket 34a, while, the ground pattern 18e in the back surface comes in contact with the first housing 10a through the gasket 34b. Thus, the electronic components mounted on the circuit board 18 are surrounded by the frame ground.

Figure 8A:
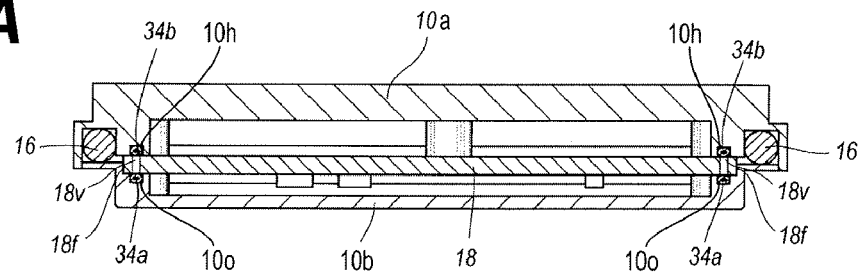
FIG. 8A is a horizontal cross section of the optical transceiver showing the circuit board and the gasket put between the housings, FIG. 8B magnifies a side portion of the circuit board shown in FIG. 8A.
Figure 8B:
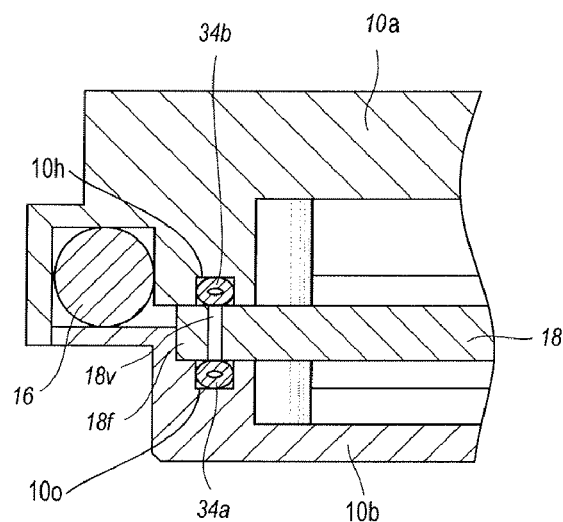
FIG. 8C illustrates a modified ground pattern provided on the circuit board.

FIG. 8A is a horizontal cross section of the optical transceiver 1, while, FIG. 8B magnifies an edge portion of the optical transceiver 1.

The edges 18f of the circuit board 18 are put between the first and second housings, 10a and 10b, through respective gaskets, 34a and 34b. Because the gasket, 34a and 34b, is made of elastic member, the circuit board 18 may be elastically supported by the housings, 10a and 10b, which may reduce the stress caused in the connection between the circuit board 18 and the plug board 19, namely, in the soldered connection between the pads of the edge connector 18p and the socket pins 19g.

Because the gasket, 34a and 34b, may be made of electrically conductive material and come in contact with the ground patterns 18e of the circuit board 18, which enables the frame ground, namely the chassis ground, to be conducted on the circuit board 18.

Figure 8C:
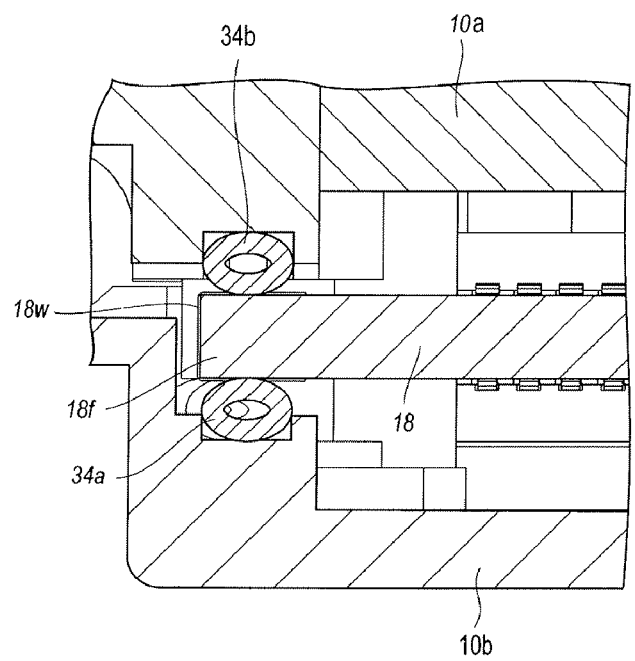

FIG. 8C is a cross section showing a modified embodiment of the present invention, where FIG. 8C also magnifies the edge portion 18f of the circuit board 18. The embodiment shown in FIG. 8C provides the ground pattern 18w formed so as to envelope the edge 18f of the circuit board 18. When the circuit on the circuit board 18 is necessary to be mounted in high density, the circuit board 18 sometimes becomes hard to provide a plurality of ground vias connecting the front and back surfaces thereof. In such a case, the ground pattern 18w enveloping the edge of the circuit board 18 may provide the chassis ground by coming in contact with the first and second housings, 10a and 10b, through the conductive gaskets, 34a and 34b.

Figure 9A:
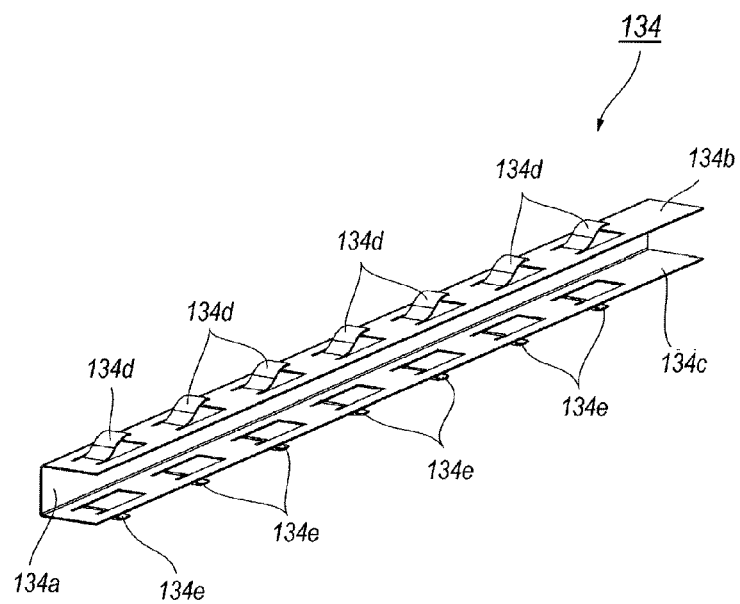
FIG. 9A is a perspective view showing another type of a gasket put between two housings.
Figure 9B:
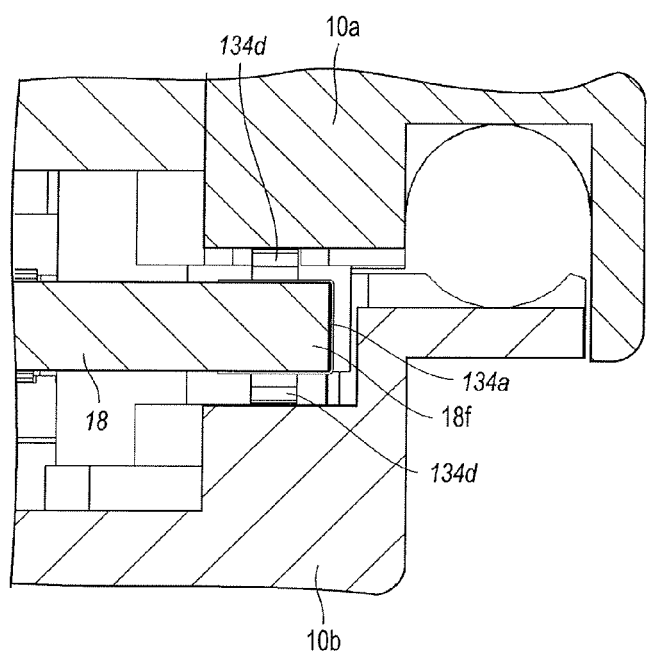
FIG. 9B is a horizontal cross section showing a side portion of the circuit board and the modified gasket shown in FIG. 9A.

FIG. 9A shows a modified embodiment of the gasket 134 according to the present invention, while FIG. 9B magnifies the cross section of the edge portion of the circuit board 18 implemented with the modified gasket 134 shown in FIG. 9A. The gasket 134 has the U-shape with the slab portion 134a and two legs 134b and 134c. The U-shaped cross section of the gasket 134 may envelope the edge portion 18f of the circuit board 18. Moreover, the legs each has a plurality of fins, 134d and 134e, where they come in elastically contact with the first and second housings, 10a and 10b. The gasket 134 shown in FIGS. 9A and 9B, may show the function same as those shown by the gasket 34.

Referring to FIG. 7D, the plug board 19 provides a socket portion 19c and a plug portion 19f. The socket portion 19c includes a plurality of pins 19g and receives the edge connector 18p of the circuit board 18. The pins 19g may be soldered to the pads of the edge connector 18p and electrically connected to respective plug pads 19b within the plug portion 19f. Accordingly, mating the pads 19b of the plug portion 19f with the connector 3a on the host system 2, the circuit on the circuit board 18 may be electrically coupled with the host system 2.

The plug board 19 may further include a projection 19d and a rib 19e. The projection 19d is formed in the side of the plug portion 18f, while, the rib 19e is formed in both surfaces of the socket portion 19c. Referring to FIG. 2 again, the optical transceiver 1 may provide a metal cover 35, which may be made of metal plate and has a shape enveloping the rib 19e, and a groove 10v in the first housing 10a. The groove 10v of the housing 10a receives the rib 19e accompanied with the metal cover 35. Similarly, the second housing 10b may provide the other groove 11v to receive the rib 19e in the back surface of the plug board 19 accompanied with another metal cover 35. The metal cover 35 may elastically come in contact with the housings, 10a and 10b.

In the arrangement around the plug board 19, the projection 19d may abut against the rear wall 10e of the first housing 10a to position the circuit and plug boards, 18 and 19, when the optical transceiver 1 mates with the electrical connector 3a of the host system 2. Moreover, because the rib 19e on the plug board 19 is set within the grooves, 10v and 11v, the plug board 19 may be prevented from making backlash when the plug 19b is extracted from the host connector 3a. The arrangement of the rib 19e and the projection 19d may protect the plug board 19 from the mechanical stress.

Figure 10A:
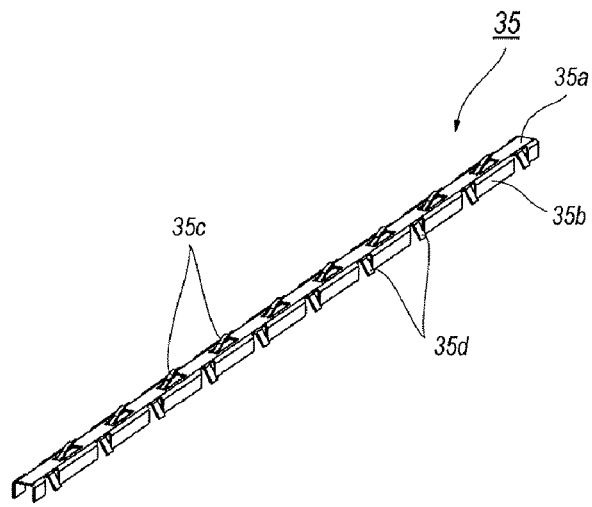
FIG. 10A shows a metal cover.

Details of the metal cover 35 and the mechanism to be assembled with the plug board 19 will be further described. FIG. 10A shows a metal cover 35 according to an embodiment of the invention. The metal cover 35 has the U-shaped cross section so as to trace the cross section of the rib 19e in the plug board 19. Specifically, the metal cover 35 includes a slab portion 35a, a plurality of primary legs 35b with an extended width and secondary legs 35d with a narrower width but extending outwardly compared to the primary legs 35b. The primary legs 35b are bent in both edges of the slab portion 35a; while, the secondary legs 35d are bent in only one edge of the slab portion 35a. Two legs, 35b and 35d, are alternately arranged with each other. The metal cover 35 further provides a plurality of fins 35c in the slab portion 35a.

As shown in FIGS. 4A and 4B, the rear end of the first and second housings, 10a and 10b, provides the groove, 10v and 11v, respectively, into which the metal cover 35 is set. FIG. 10C is a cross section showing the rib 19e, the metal cover 35, and the grooves, 10v and 11v. The ribs 19e in both surfaces of the plug board 19 may be covered by the metal cover 35 by the U-shaped cross section thereof, and the metal cover 35 is set within the grooves, 10v and 11v, in respective housings, 10a and 10b. The secondary legs 35d and the fins 35c come in contact to the rear and bottom walls of the grooves, 10v and 11v.

Figure 10B:
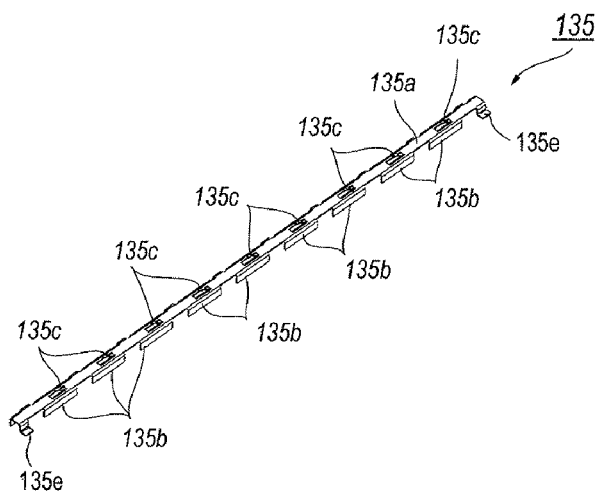
FIG. 10B shows a modified metal cover.
Figure 10C:
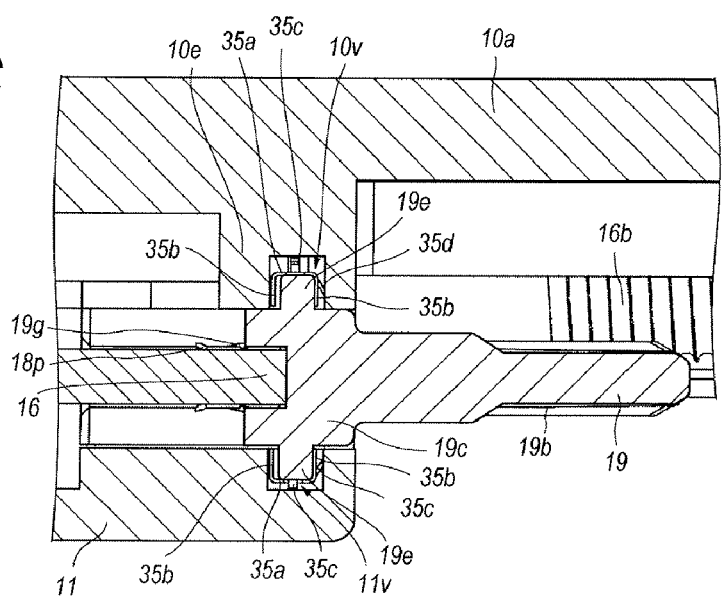
FIG. 10C is a cross section showing the metal cover, the grooves in the first and second housings, and the ribs in the plug board.

FIG. 10B shows a metal cover 135 according to another embodiment of the invention. The metal cover 135 of the present embodiment also has the U-shaped cross section fit to the shape of the rib 19b. The metal plate 135 of the present embodiment further provides a tab 135e in addition to the primary and secondary legs, 135b and 135d. The tab 135e extends toward a direction opposite to a direction to which the secondary legs 135d extends. The tab 135e of the present embodiment makes the direction of the metal cover easily distinguishable.

In a further modified embodiment, the groove, 10v and 11v, may have two types of depths alternately arranged to others. The deeper portion may receive the fin 35c, that is, the tip of the fin 35c of the metal cover 35 comes not in contact with the bottom of the groove, 10v and 11v. In this embodiment, the metal cover 35 is not affected by the elastic force along the depth direction of the groove, 10v and 11v.

The secondary leg 35d and the rib 19e may securely prevent the metal cover 35 from sliding within the groove, 10v and 11v, which protects the edge connector 18p and the socket pins 19g from breakage even when the optical transceiver 1 is set on the host system 2, or removed from the host system 2. On the other hand, the circuit board 18 is elastically supported by the first and second housing, 10a and 10b.

Figure 11A:
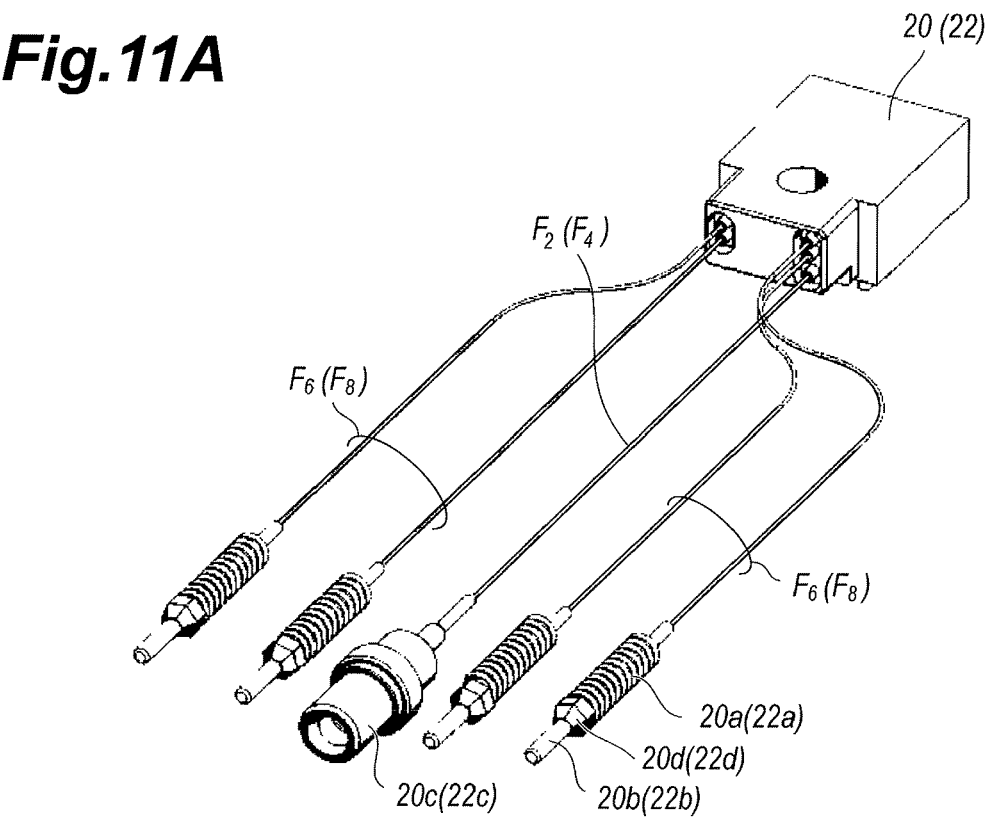
FIG. 11A illustrates the optical multiplexer and inner fibers extended therefrom.

Next, the optical multiplexer 20 and the optical demultiplexer 22 will be described accompanied with the inner fibers, $F_2$ to $F_8$, extending therefrom. Although FIG. 11A shows a perspective view of the optical multiplexer 20 with the inner fibers, $F_2$ and $F_6$, the same arrangement with those shown in FIG. 11A are applicable to the optical demultiplexer 22 and the inner fibers, $F_4$ and $F_8$.

In the rear end of the optical multiplexer 20, two inner fibers $F_6$ heading to the TOSAs 32 are output from one side, while, the other side thereof outputs three inner fibers, $F_6$ and $F_2$. These inner fibers, $F_2$ and $F_6$, have the pig-tailed configuration. During the assembly of the optical transceiver 1, the optical multiplexer 20 with five inner fibers, $F_2$ and $F_6$, is mounted on the first housing 10a. Respective lengths of the inner fibers, $F_2$ and $F_6$, are pre-adjusted in advance to the installation because the positions of the optical components are predetermined and the lengths of the fibers connecting them are also determined. The optical transceiver 1 of the present embodiment installs the inner connectors to couple the inner fibers $F_6$ with the TOSAs 32 without using any fusion splicing of the fibers. Fusion splicing is generally necessary to prepare a surplus length of fibers, and this surplus length of fibers is necessary to be orderly enclosed within the housing. The present optical transceiver, as described above, uses the inner connectors 26 without preparing any surplus length of the inner fibers, $F_2$ and $F_6$.

Figure 11B:
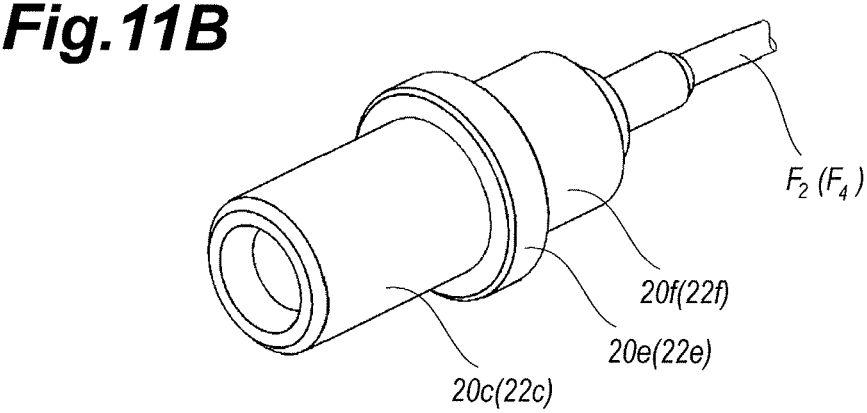
FIG. 11B illustrates the sleeve assembly set in the optical receptacle.

As shown in FIG. 11B, the sleeve assembly may be made of metal and includes, from the front thereof, the first cylinder 20c, the flange 20e and second cylinder 20f. The second cylinder receives the inner fiber, $F_2$ and $F_4$, coming from the optical multiplexer 20, or the optical demultiplexer 22. The sleeve assembly may couple the external fiber inserted into the first cylinder with the inner fiber, $F_2$ and $F_4$, secured in the second cylinder 20f; then, the external fiber may optically couple with the TOSAs 32.

Next, the front tray 24, the inner connectors 26 and the latch unit 28 installed in the optical transceiver 1 according to the present embodiment will be further described.

Figure 12:
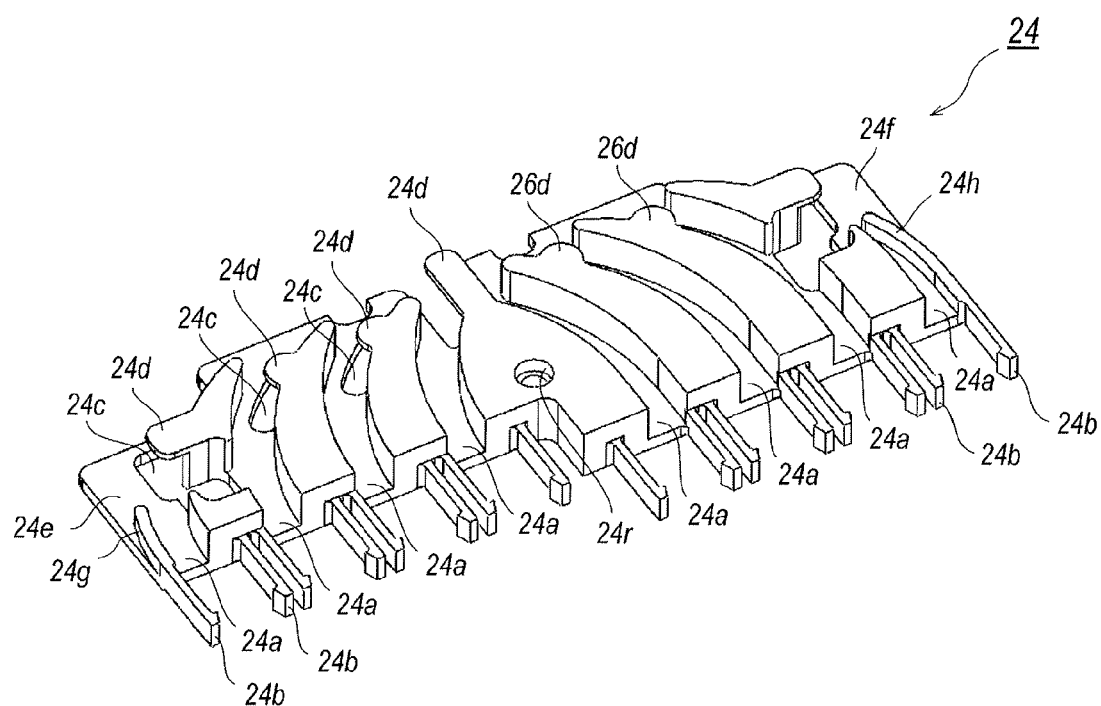
FIG. 12 is a perspective view showing the front tray according to an embodiment of the present invention.

FIG. 12 is a perspective view showing the front tray 24 of an embodiment of the present invention. The tray 24, as already described, provides four (4) slots 24a for guiding the inner fibers $F_6$ coupled with the optical multiplexer 20 with the TOSAs 32 and other four (4) slots 24a for guiding the inner fibers $F_8$ connecting the optical demultiplexer 22 with the ROSAs 30. The slots 24a have the same pitch in the rear side thereof. The pitch is substantially equal to the arrangement of the OSAs, 30 and 32; but the slots 24a are gradually bent toward the center as closing the optical receptacle 14.

Respective slots 24a accompany with a pair of latch fingers 24b in the rear end thereof. The latch fingers 24b may engage with the inner connector 26. The slot 24a gradually narrows the width thereof from the rear to the front and has a stopper 24c and an eave 24d in a front side thereof to prevent the fibers, $F_6$ and $F_8$, set within respective slots 24a from straying out. One side portion of the front tray 24 provides a guiding space 24e, into which the inner fibers $F_8$ heading to the fourth region $R_4$ pass, and a wall 24g for setting a curvature of the inner fibers $F_8$, while, the other side portion provides another guide space 24f and a wall 24h, through which the inner fibers $F_6$ heading to the fourth region $R_4$ pass and the wall 24h determines the curvature of the fibers $F_6$. This front tray 24 may be fixed to the first housing 10a with a screw passing through the center hole 24r and engaged with the tapped hole 11c shown in FIG. 4A.

Figure 13A:
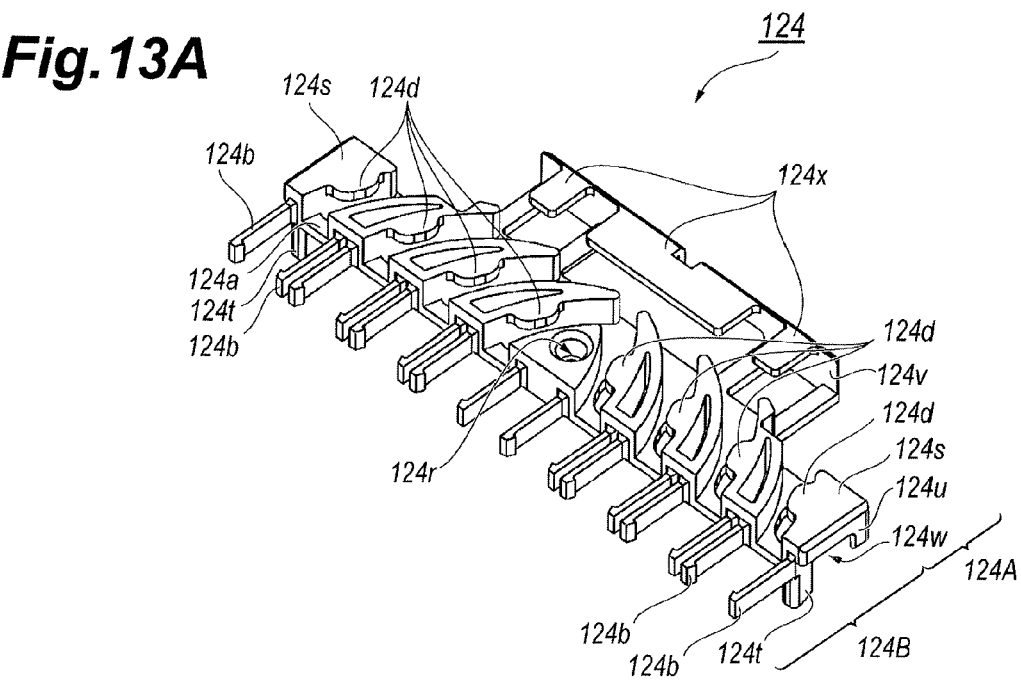
FIG. 13A is a perspective view showing a front tray according to another embodiment of the present invention.
Figure 13B:
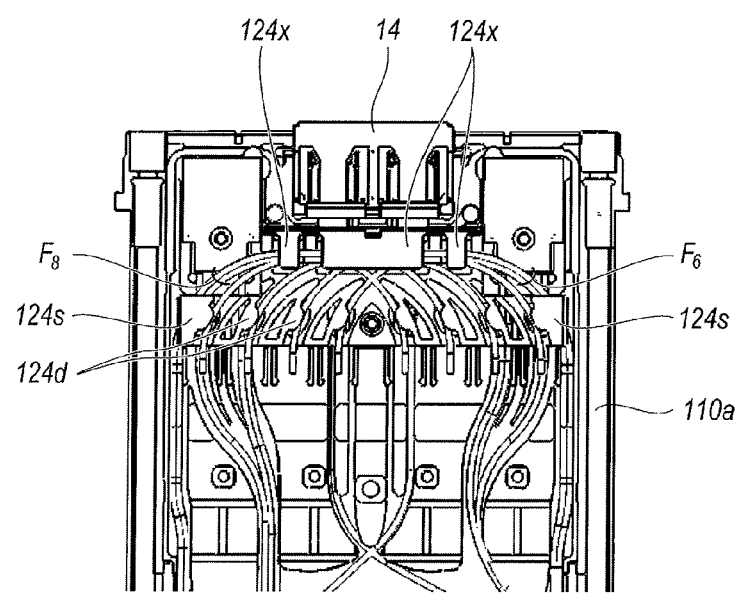
FIG. 13B shows a front portion of the optical transceiver that installs the front tray shown in FIG. 13A with inner fibers in respective slots of the front tray.

FIG. 13A is a perspective view showing a front tray 124 according to another embodiment of the invention, while FIG. 13B is a plan view showing the front tray 124 that sets the inner fibers, $F_6$ and $F_8$, in respective slots.

The front tray 124 includes a front portion 124A and a rear portion 124B. The rear portion provides a plurality of slots 124a with a pair of latch fingers 124b and a eave 124d to prevent the inner fiber from straying out and a tapped hole 124r. The rear portion 124B further provides, in respective sides thereof, a ceiling 124s and guide walls, 124t and 124u, where they constitute a guide slot 124w for the inner fibers, $F_6$ and $F_8$, which are drawn longitudinally along the edge of the first housing 10a to head to the lateral direction.

The front portion 124A may guide the inner fibers, $F_6$ and $F_8$, and provides a front wall 124v and front eaves 124x. The front wall 124v extends laterally to prevent the inner fibers, $F_6$ and $F_8$, from protruding forwardly; while, the front eaves 124x extend backward from the front wall 124v so as to cover the front portion of the tray 124. The structures, 124v and 124x, may prevent the inner fibers, $F_6$ and $F_8$, from straying out from the front portion 124A. The inner fibers, $F_6$ and $F_8$, which are drawn along the side of the front tray 124 and bent toward lateral direction, may be covered by the ceiling 124s at the side and the front eaves 124x.

Figure 14:
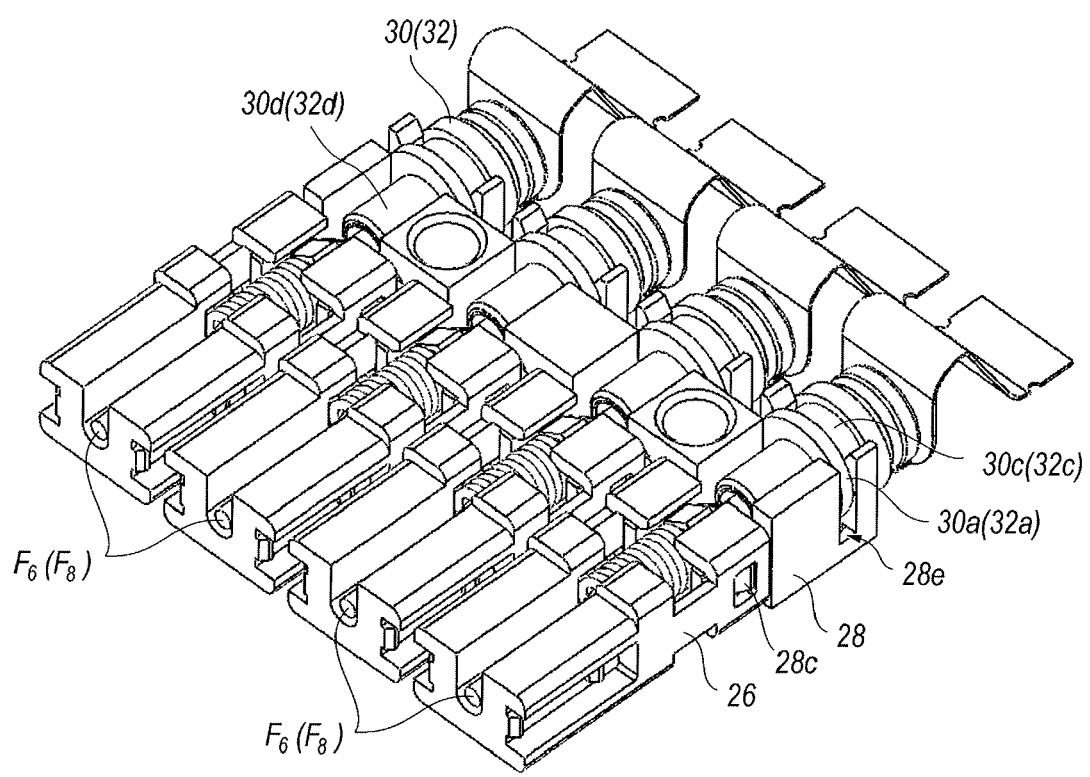
FIG. 14 is a perspective view showing the inner connector coupled with the latch unit.
Figure 15A:
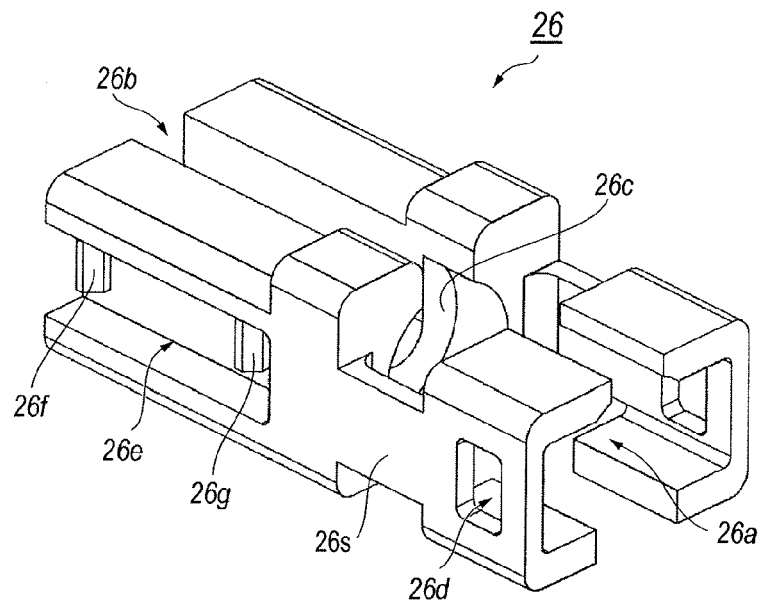
Figure 15B:
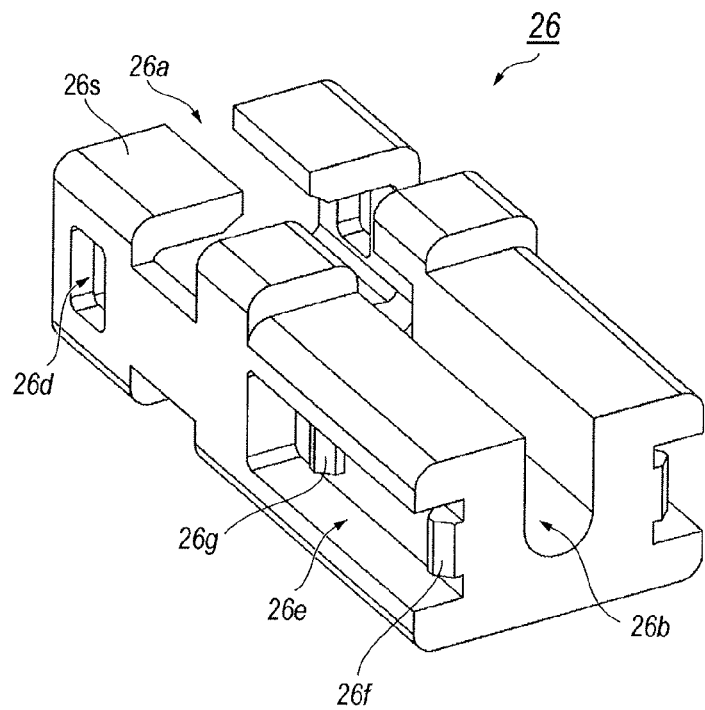
FIG. 15B shows the inner connector viewed from the front.

FIG. 14 illustrates an intermediate assembly of the inner connectors 26, the latch unit 28 and OSAs 30. Next, details of the inner connector 26 will be described. The inner connector 26, as shown in FIGS. 15A and 15B, provides two spaces, 26a and 26b, in the rear and front side thereof, respectively. These two spaces, 26a and 26b, are partitioned by the center wall 26c. The rear space 26a receives the coil member 20a attached in the end of the inner fibers $F_6$ shown in FIG. 11A. The rear space 26a also provides an opening 26d in respective side fingers 26s thereof, which are engaged with the projection 28c of the latch unit 28. The side fingers 26s has a U-shaped cross section, where the latch finger 28b of the latch unit, which is described later in detail, is to be set within the U-shape. Engaging the projection 28c with the opening 26d, the inner connector 26 may engage with the latch unit 28. Concurrently with this engagement, the ferrule 20b in the tip of the inner fibers $F_6$ may be inserted within the bore of the sleeve 30d of the ROSA 30, which may optically couple the inner fiber $F_6$ with the semiconductor optical device in the ROSA 30.

The coil member 20a, which is set in the rear space 26a, abuts against the center wall 26c to push the ferrule 20b toward the ROSA 30 when the inner connector 26 is engaged with the latch unit 28, which makes the physical contact between the tip of the ferrule 20a and the tip of the stub secured within the sleeve 30d. Thus, the optical transceiver 1 of the present embodiment may realize the optical coupling between the inner fiber $F_6$ and the ROSA 30 by the physical contact (PC) arrangement without using any fusion splicing between fibers. Accordingly, even when one of the OSAs, 30 and 32, causes failure, only the degraded OSA may be easily replaced without influencing the rest OSAs.

The front side wall of the inner connector 26 provides a groove 26e within which two projections 26f and 26g are formed. The groove 26e receives the latch finger 24b of the front tray 24. The inner connector 26 may slide in front and rear along the latch finger 24b. When the projection provided in the edge of the latch finger 24b engages with the first projection 26g provided in the deeper side of the groove 26e, that is, the projection of the latch finger 24b is set in the pocket formed between the deeper side projection 26g and the end wall of the groove 26e, the inner connector 26 temporarily positions apart from the latch unit 28 by being pulled in the side of the front tray 24. When the optical coupling between the inner fiber $F_6$ with the OSA, 30 or 32, is finally performed, the projection of the latch finger 24b slides within the groove 26e and engages with the second projection 26f.

Figure 16A:
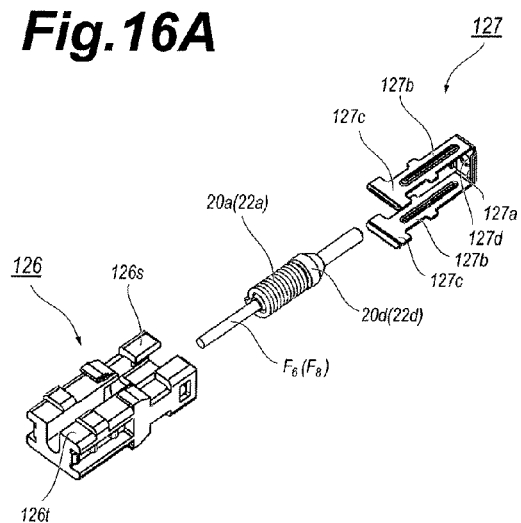
FIG. 16A is an exploded view of an inner connector according to another embodiment of the present invention.
Figure 16B:
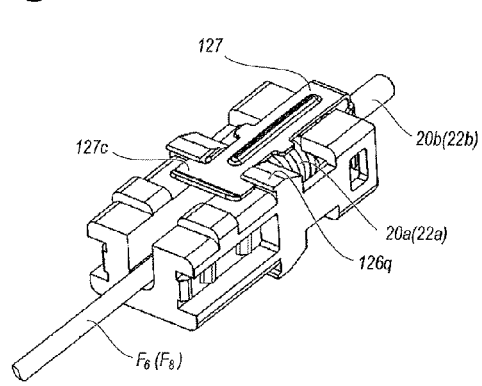
FIG. 16B shows the assembled inner connector shown in FIG. 16A.
Figure 16C:
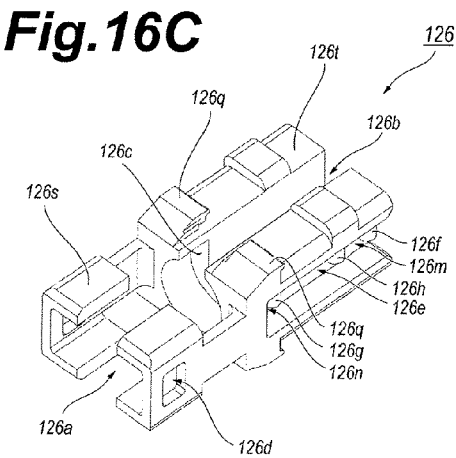
FIG. 16C shows a connector body.
Figure 16D:
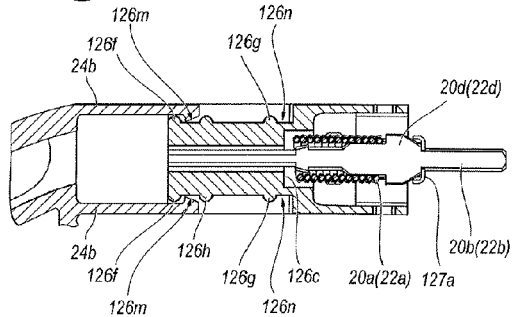
FIG. 16D is a cross section showing the inner connector illustrated in FIG. 16B engaged with the latch finger of the front tray.

FIGS. 16A to 16D describe an inner connector 126 and the stopper 127 combined with the inner connector 126 according to another embodiment of the present invention, where FIG. 16A is an exploded view, FIG. 16B shows an assembled connector, FIG. 16C is a perspective view of the inner connector, and FIG. 16D is a cross section showing the positional relation between the inner connector, the stopper, the inner fiber, and the latch finger 24b of the front tray 24.

The ferrule 20b provided in the tip of the inner fiber, $F_6$ and $F_8$, accompanies with a flange 20d. The coil member 20a, which continues from the ferrule 20b, is put between the center partition 126c of the inner connector 126 and this flange 20d. The inner connector 126, similar to those 26 shown in FIGS. 15A and 15B, provides two spaces, 126a and 126b, the former of which is put between two side fingers 126s and bottom wall, while, the latter of which is formed by another housing portion 1261. The stopper 127, which is made of metal plate, includes a beam 127a and a pair of legs 127b each extending from the beam 127a; thus, the stopper 127 has the U-shaped cross section. The beam 127a provides an opening 127d, through which the ferrule 20b passes whose diameter is less than a diameter of the flange 20d. The end of the leg 127b provides a tab 127c that engages with a hook 126q formed in the top of the center wall 126c of the inner connector 126.

The inner fiber, $F_6$ and $F_8$, is set in the inner connector 126 such that the ferrule 20b passes the opening 127d in the beam 127a of the stopper 127 as the inner fiber, $F_6$ and $F_8$, is set within the front space 126b, and the stopper 127 engages with the inner connector 126 such that the tab 127c engages with the hook 126q as abutting the coil member 20a against the center partition 126c. Because the diameter of the flange 20d is larger than that of the opening 127d, the rearward motion of the ferrule 20b may be prevented by the stopper 127. Accordingly, the inner fiber, $F_6$ and $F_8$, and the ferrule 20d may be prevented from disassembled with the inner connector 126.

The inner connector 126 of the present embodiment further provides the groove 126e in the side of the housing 1261. The groove 126e includes two pockets, 126m and 126n, and three projections, 126f to 126h. The first pocket 126m is put between the first and third projections, 126f and 126h, while, the second pocket 126n is formed in a deeper side of the second projection 126g. Two pockets, 126m and 126n, may receive and engage with the hook in the tip of the latch finger 124b of the front tray 124.

As illustrated in FIG. 16D, sliding the inner connector 126 rearward to set the tip of the latch finger 124b in the first pocket 126m, the tip of the ferrule 20b moves in the position where the ferrule 20b optically couples with the OSA, 30 and 32. On the other hand, sliding the inner connector 126 frontward to set the tip of the latch finger 124b in the second pocket 126n, the ferrule 20d may not interfere with the latch unit 128 and the OSA, 30 and 32.

Accordingly, sliding the inner connector 126 rearward to engage the latch finger 124b with the first projection 126g at the first pocket 126m in advance to set the latch unit 128 and the OSA, 30 and 32, in respective position in the housing 10a, the ferrule 20b may be set in the regular position without engaging with the latch unit 28. Then, the inner fiber, $F_6$ and $F_8$, may be drawn within the first housing 10a as they are set in the final position. After drawing the inner fiber, $F_6$ and $F_8$, fixing them thereat, and sliding the inner connector 126 frontward to engage the latch finger 124b with the second projection 126g at the second pocket 126n, the latch unit 28 and the OSA, 30 and 32, may be assembled within the first housing 10a without being interfered with the ferrule 20b and the inner connector 126.

Figure 17:
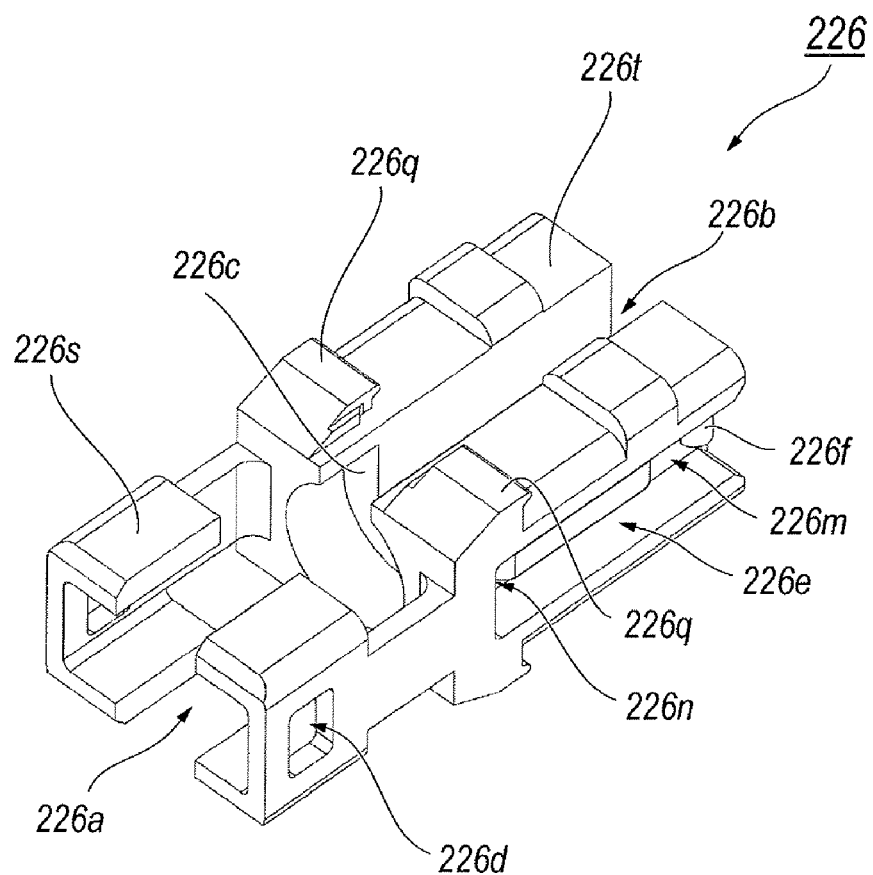
FIG. 17 is a perspective view showing another type of the inner connector.

FIG. 17 is a perspective view showing another type of the inner connector 226 which is modified from that shown in FIG. 16B. The modified inner connector 226 shown in FIG. 17 provides the groove 226e with two pockets, 226m and 226n, but provides only one projection 226f. Other projections, 126g and 126h, appeared in the former embodiment are replaced by a terrace connecting these two projections. This type of the inner connector 226 may show the same function as those appeared in the former embodiment 126; that is, two pockets, 226m and 226n, determines two position of the ferrule 20b.

Figure 18A:
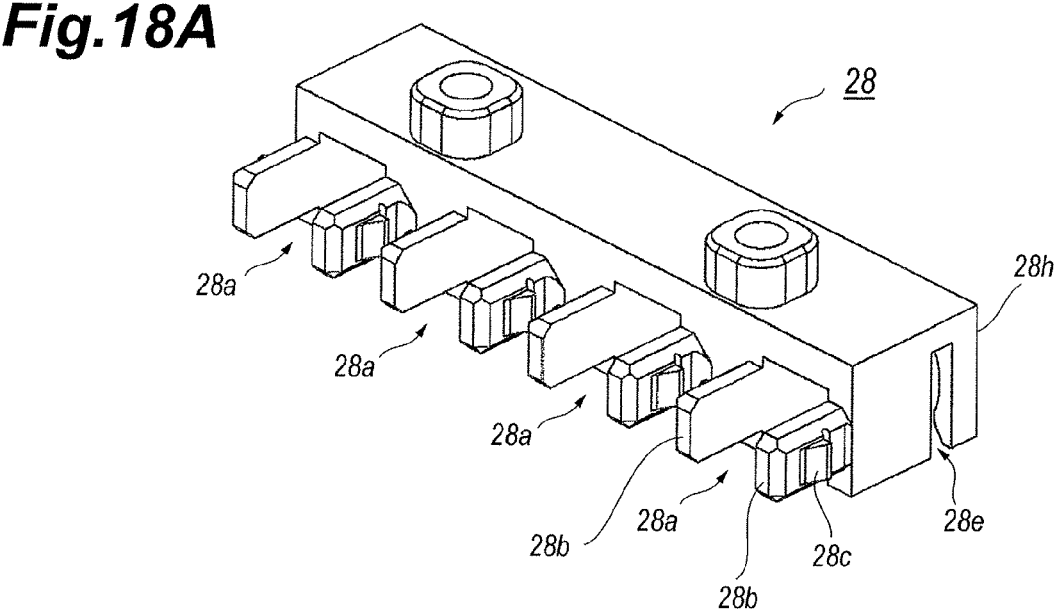
FIG. 18A shows a latch unit according to an embodiment of the present invention.
Figure 18B:
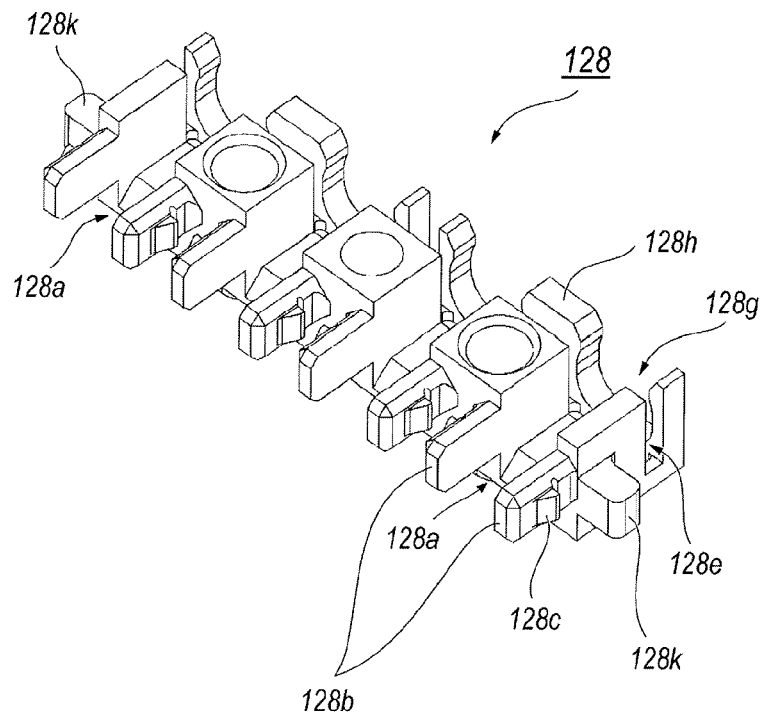
FIG. 18B shows a latch unit according to another embodiment of the present invention.

As illustrated in FIGS. 14 and 18, where FIG. 18A is viewed from the bottom; while, FIG. 18B is viewed from the top thereof, the latch unit 28 provides four slots 28a corresponding to the number of the ROSAs 30. Each slot 28a accompanies with a pair of latch fingers 28b in respective sides thereof, and the latch finger 28b provides a projection 28c in the outer surface. This projection 28c engages with the opening 26d of the inner connector 26 to mate the inner connector 26 with the latch unit 28. The rear side of the latch unit 28 provides a slit 28e.

Figure 19A:
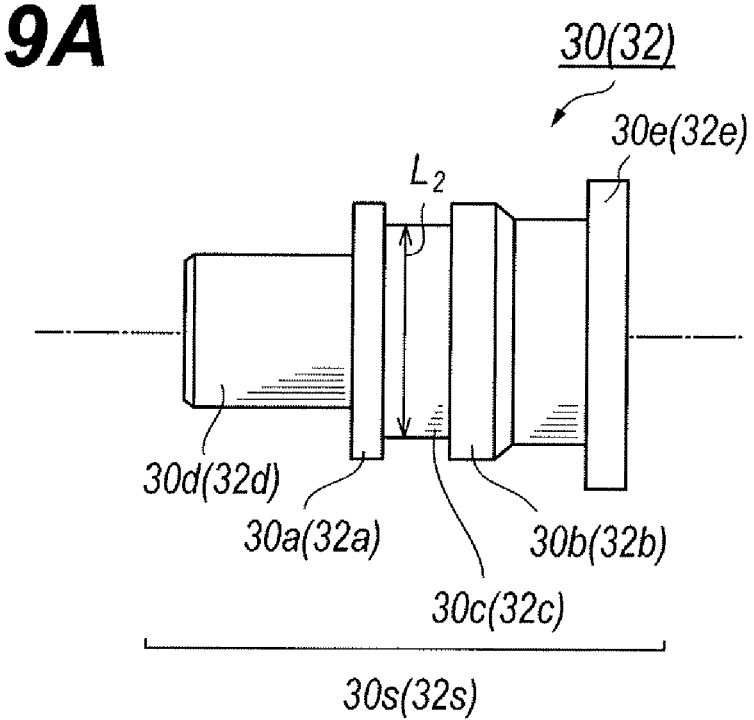
FIG. 19A is a side view of an OSA.
Figure 19B:
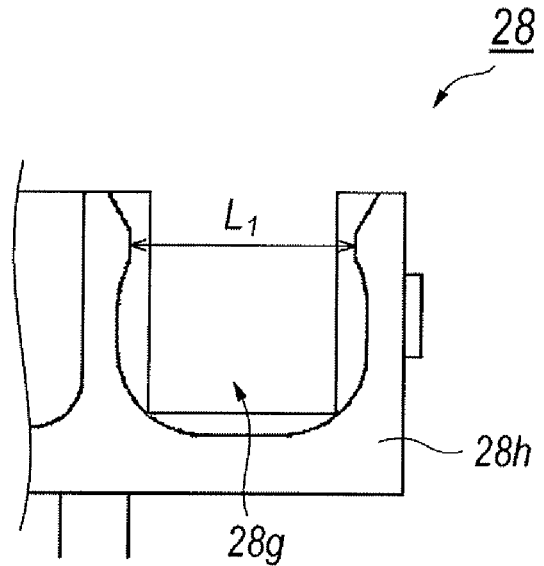
FIG. 19B is a rear view of one slot of the latch unit.

FIG. 19A is a side view of the ROSA 30, while, FIG. 19B shows one slot of the latch unit 28 viewed from the rear. The ROSA 30, as shown in FIG. 19A, has two flanges, 30a and 30b along the optical axis thereof, and a neck 30c between the flanges, 30a and 30b. While, the latch unit 28 provides a horseshoe-shaped cut 28g in the rear wall 28h thereof, as illustrated in FIG. 19B. The diameter $L_2$ of the neck 30c of the ROSA 30 is set to be slightly larger than the frontage $L_1$ of the cut 28g. Because the latch unit 28 is made of resin, the ROSA 30 may be easily set in the latch unit 28 as expanding the frontage of the cut 28g. The ROSA 30, once set in the latch unit 28, becomes hard to be dropped from the cut 28g, which may enhance the productivity of the intermediate assembly. As illustrated in FIG. 14, the front flange 30a of the ROSA 30 is set in the slit 28e of the latch unit 28, and the sleeve 30d is set within one of the slot 28 corresponding thereto. In FIG. 19A, the OSA, 30 and 32, comprises a sleeve member 30s that includes, as described above, the sleeve 30d, the front flange 30a, a neck 30c, and the rear flange 30b; and an optical device 30e. The sleeve member 30s may optically couple the inner fiber, $F_6$ and $F_8$, with the optical device 30e; while, the optical device 30e installs a semiconductor optical device, such as a photodiode for the ROSA 30 and a laser diode (LD) for the TOSA 32.

The latch unit 128 according to another embodiment of the optical transceiver 1 will be described as referring to FIG. 18B. The latch unit 128 of the present embodiment includes, in addition to structures shown in FIG. 18A, a projection 128k in a side wall thereof. This projection may prevent the inner fibers passing thereunder from straying out.

Figure 20:
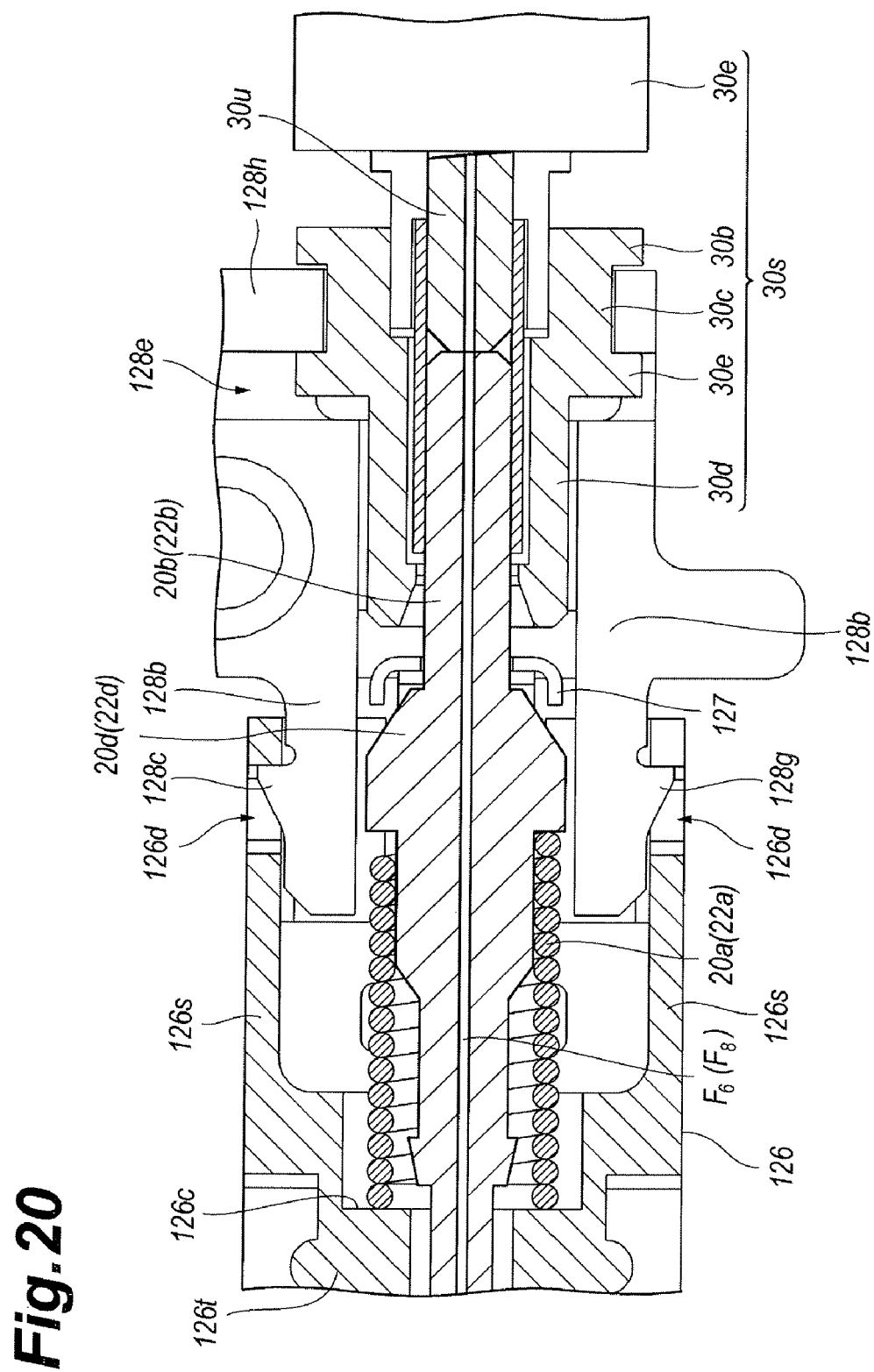
FIG. 20 is a cross section taken along the optical axis of the inner fiber set in the inner connector.

FIG. 20 is a cross section taken along the optical axis of the inner fiber, $F_6$ or $F_8$, set in the inner connector 126. Mating the inner connector 126 with the latch unit 128, the ferrule 20b of the inner fiber $F_6$ is inserted within a bore of the sleeve assembly 30s and the tip thereof comes in physically contact with a tip of the stub 30u of the OSA 30 set in the latch unit 128. The coil member 20a comes in one end thereof in contact with the center partition 126c of the inner connector 126 and the other end comes in contact with the flange 20d, which pushes the ferrule 20b toward the OSA 30. Then the physical contact between the tip of the ferrule 20b and that of the stub 30u may be securely realized even in a limited inner space of the optical transceiver 1.

Another modification of the inner connector, 26 and 126, has an arrangement of the groove, that is, the first embodiment of the inner connector 26 provides two projections, 26f and 26g, while, the second embodiment provides three projections, 126f to 126h, or one projection 126f with the terrace connecting rest two projections, 126g and 126h. The still modified inner connector may provide only one projection in the groove 126e. The one projection merely hooks the latch finger, 24b and 124b, to prevent the inner connector 26 and 126, from slipping out from the front tray 24 during the assembly of the optical transceiver 1. Coupling the inner connector with the latch unit 28, the inner connector may be free from the front tray 24. When only a limited space is left between the front tray 24 and the latch unit 28, the arrangement of the inner connector thus described becomes effective.

Figure 21A:
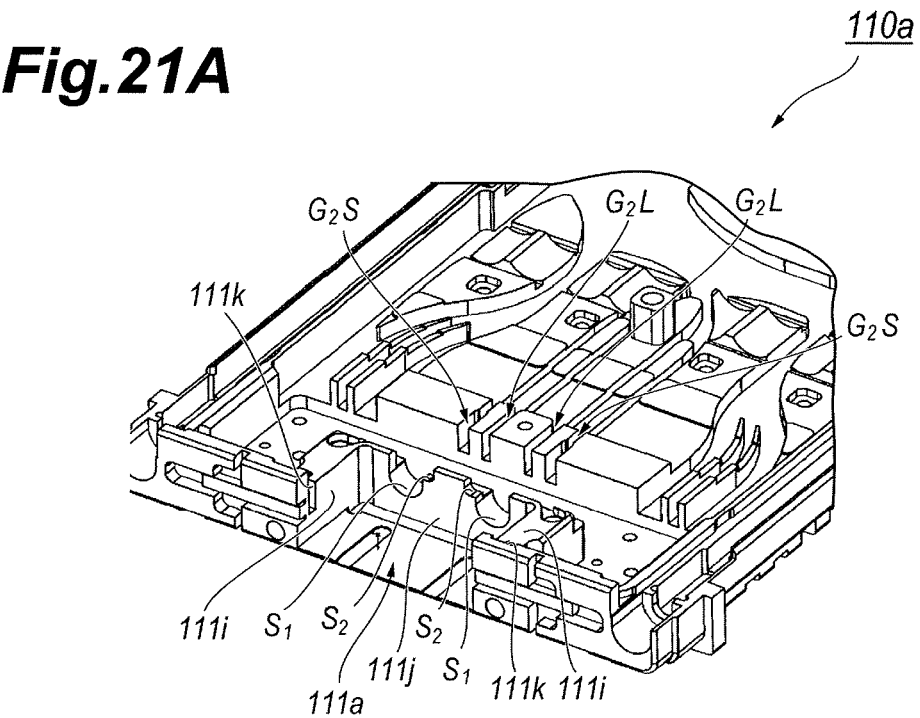
FIG. 21A is a perspective view showing a front portion of the first housing according to another embodiment of the present invention.
Figure 21B:
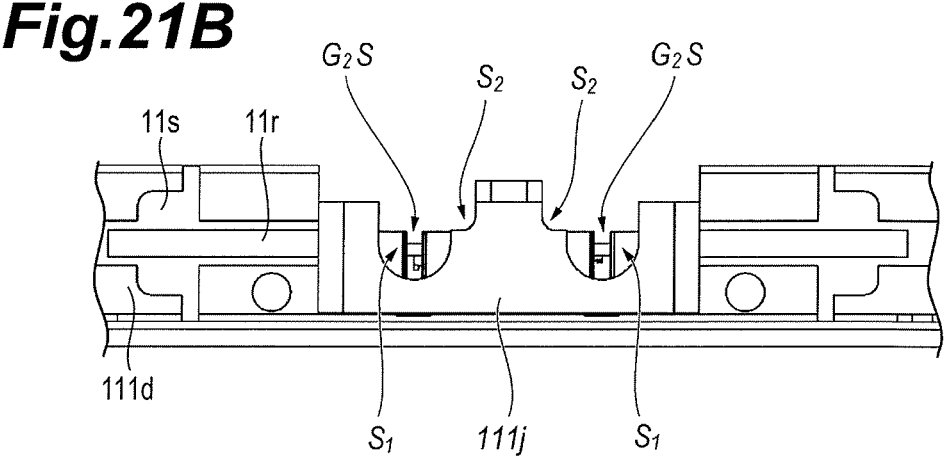
FIG. 21B is a front view thereof.

Another type of the housing 110 and the optical receptacle mounted in the front center of the housing will be described. FIG. 21A is a perspective view showing a front portion of the first housing 110a accordingly to another embodiment of the present invention, and FIG. 21B is a front view thereof. As shown in FIGS. 21A and 21B, the front portion of the first housing 110a includes a center area 111a partitioned by side walls 111i and the rear wall 111j. The rear wall 111j provides a pair of double cuts each including a base cut $S_1$ and sub cut $S_2$. The pitch between the base cuts $S_1$ is identical with the pitch between the sleeves of the SC type optical connector, while, the pitch between the sub cuts $S_2$ is narrower than the pitch of the base cuts $S_1$ and identical with the pitch of the LC type optical connector.

The first housing 110a includes two types of grooves, $G_2S$ and $G_2L$, in the second section $R_2$. The distance between the outer grooves $G_2S$ is substantially identical with the pitch of the base cut $S_1$, while, the distance between the inner grooves $G_2L$ is equal to that of the sub cut $S_2$. The first housing 110a further provides the grooves, $G_4S$ and $G_4L$, in the third section $R_3$ and they continue from the corresponding grooves, $G_2S$ and $G_2L$, in the second section $R_2$. Thus, these grooves $G_2S$ to $G_4L$ are arranged in straight.

Figure 22A:
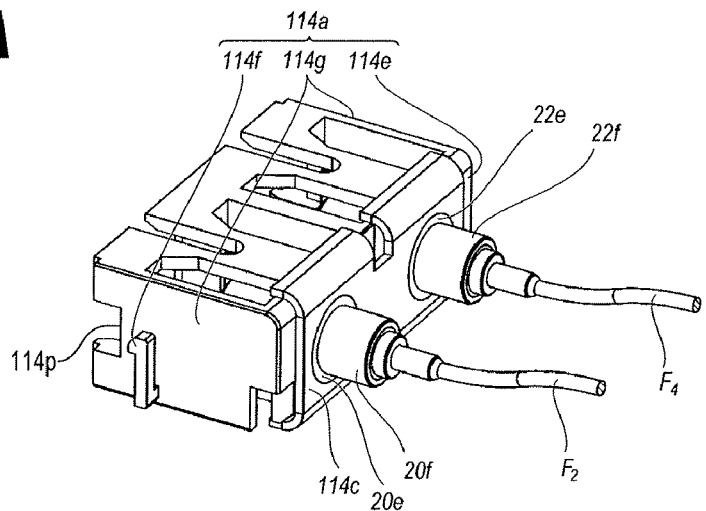
FIG. 22A views an optical receptacle according to an embodiment of the invention, which is viewed from the rear, FIG. 22B views the optical receptacle from the front.
Figure 22B:
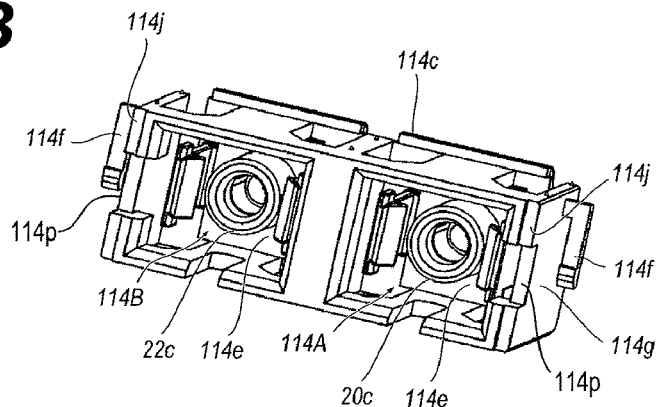
FIG. 22C is an exploded view of the optical receptacle.
Figure 22C:
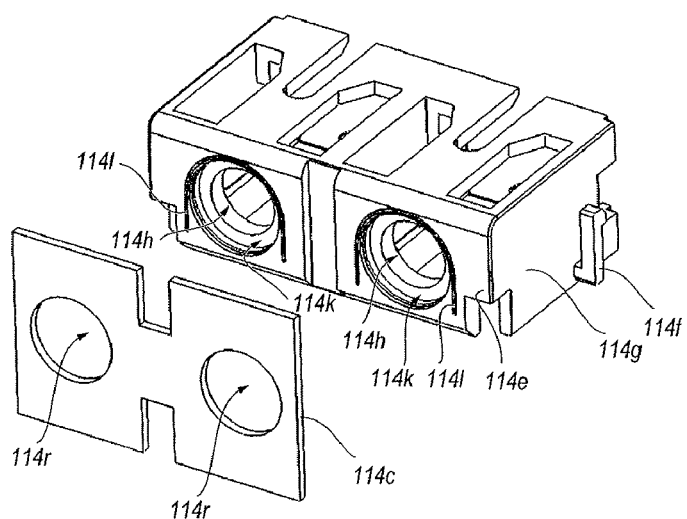

FIGS. 22A to 22C illustrate an optical receptacle with the type of the SC receptacle according to a modification of the present invention, where the optical receptacle 114 is assembled in the center area 111a. FIG. 22A views the optical receptacle 114 from the rear, FIG. 22B views the optical receptacle 114 from the front, and FIG. 22C is an exploded view of the optical receptacle 114. Similar to the optical receptacle 14 shown in FIG. 2, the modified optical receptacle 114 includes the housing 114a, the sleeve holder 114b, and the conductive sheet 114c.

The optical receptacle 114 includes two cavities, 114A and 114B, to receive the first cylinder, 20c and 22c, of the sleeve assembly. Two cavities, 114A and 114B, are partitioned by the rear wall 114e to which the front surface of the flange 20e comes in contact. The rear wall 114e also provides two openings 114h through which the first cylinder 20c passes. Each opening 114h accompanies with a step 114k in a periphery thereof into which the flange, 20e and 22e, of the sleeve assembly is set.

Figure 23:
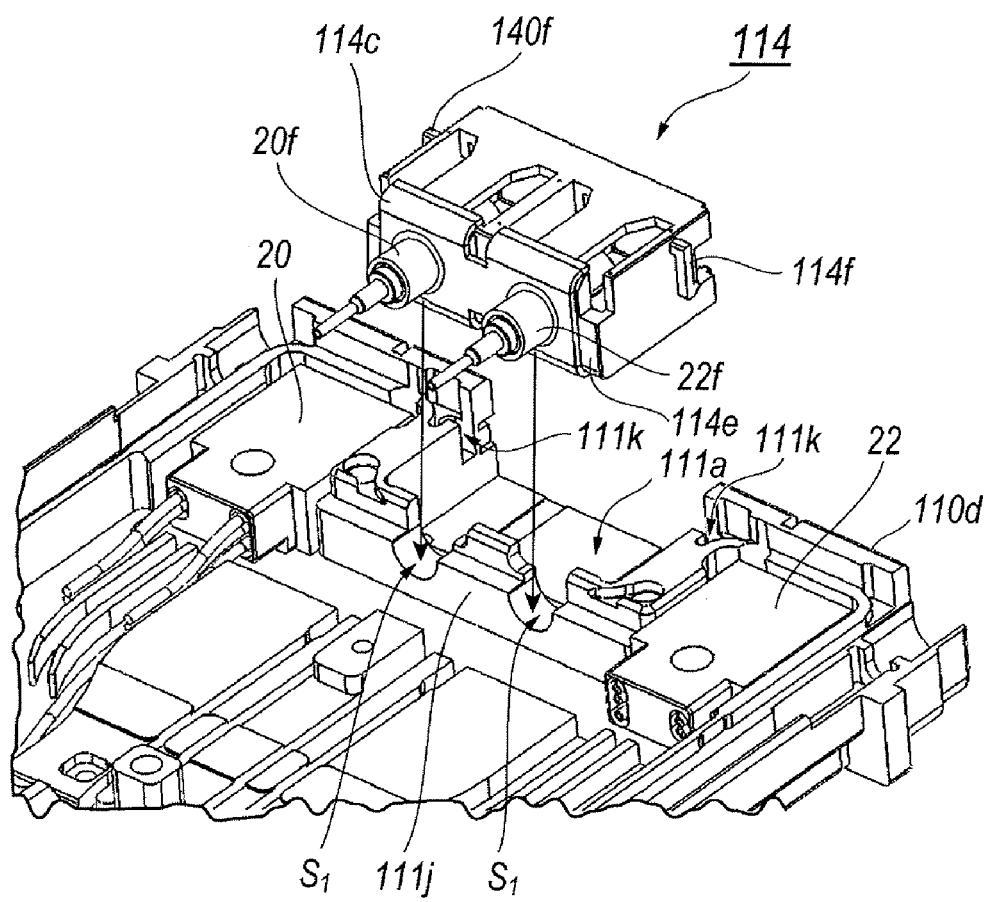
FIG. 23 shows a process to mount the optical receptacle in the center area of the first housing.

The conductive sheet 114c is attached to the rear wall 114e. The conductive sheet 114c, which is made of electrically conductive material, for instance, it may be made of electrically conductive non-woven fabric. The optical receptacle 114 thus assembled the housing 114a with the sleeve assemblies, 20 and 22, and the conductive sheet 114c is installed on the center area 111a of the first housing 110a as shown in FIG. 23.

Specifically, the second cylinders, 20f and 22f, of the sleeve member are set on respective base cuts $S_1$ as passing the rear wall 111j of the center area 111a. The optical receptacle shown in FIGS. 22 and 23 has the configuration of the SC type receptacle. The conductive sheet 114c is put between the rear wall 114e of the receptacle housing 114a and the rear wall 111j of the center area 111a. Screwing the face cover 12 to the front wall 110d of the first housing 110a, the face cover 12 presses the optical receptacle 114 against the rear wall 111j, then, the conductive sheet 114c may be securely set between the optical receptacle 114 and the rear wall 114j.

The optical receptacle 114 according to the present embodiment may further provide a lug 114f secured in the side wall 114g only by an end portion thereof. The lug 114f extends up and down from the secured portion. Accordingly, the lug 114f in the other end thereof may be twisted around the secured portion. The first housing 110, on the other hand, provides a pocket 111k in both side walls 111i of the center area 111a. When the optical receptacle 114 is set on the center area 111a, the front surface of the lug 114f abuts against the rear surface of the pocket 111k, which presses the optical receptacle 114 rearward against the rear wall 111j and may temporarily fix the optical receptacle 114 until it is finally sandwiched between the face cover 12 and the rear wall 111).

Figure 24:
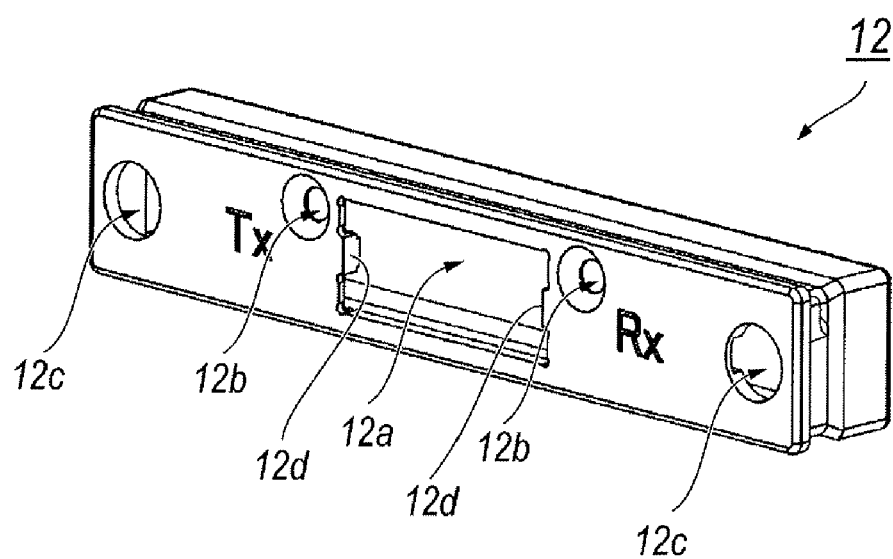
FIG. 24 shows a face cover attached to the housing.

Further specifically describing the relation between the face cover 12 and the optical receptacle 114, the face cover 12 as shown in FIG. 24 provides a port 12a through which the optical receptacle 114 is exposed, and two pairs of holes, 12b and 12c, the former of which 12c passes the screw latch 16 therethrough, while the latter 12b passes the screw for fixing the face cover 12 to the first housing 110a. The port 12a provides in both sides thereof a pressing tab 12d extending rearward. The pressing tab 12d abuts the optical receptacle 114 against the front wall 114j of the optical receptacle 114. Pressed by the face cover 12, the optical receptacle 114 is pushed rearward, and the rear surface of the flange of the sleeve assembly, 20e and 22e, comes in contact with the rear wall 111) as putting the conductive sheet 114c therebetween.

As shown in FIG. 22C, the conductive sheet 114c provides holes 114r, through which the first cylinder, 20c and 22c, of the sleeve assembly passes. In the present embodiment, the hole 114r has diameter slightly less than a diameter of the first cylinder, 20c and 22c, then, the first cylinder, 20c and 22c, is inserted into the hole 114r and the opening 114h as expanding the size of the hole 114r, which may prevent to cause a gap between the first cylinder, 20c and 22c, and the hole 114r and securely shield the inside of the housing 110.

Still further, the rear wall 114e of the receptacle housing 114a provides a plurality of protrusions around the step 114k which may make the conductive sheet 114c reliably contact to the rear wall 111j.

Figure 25:
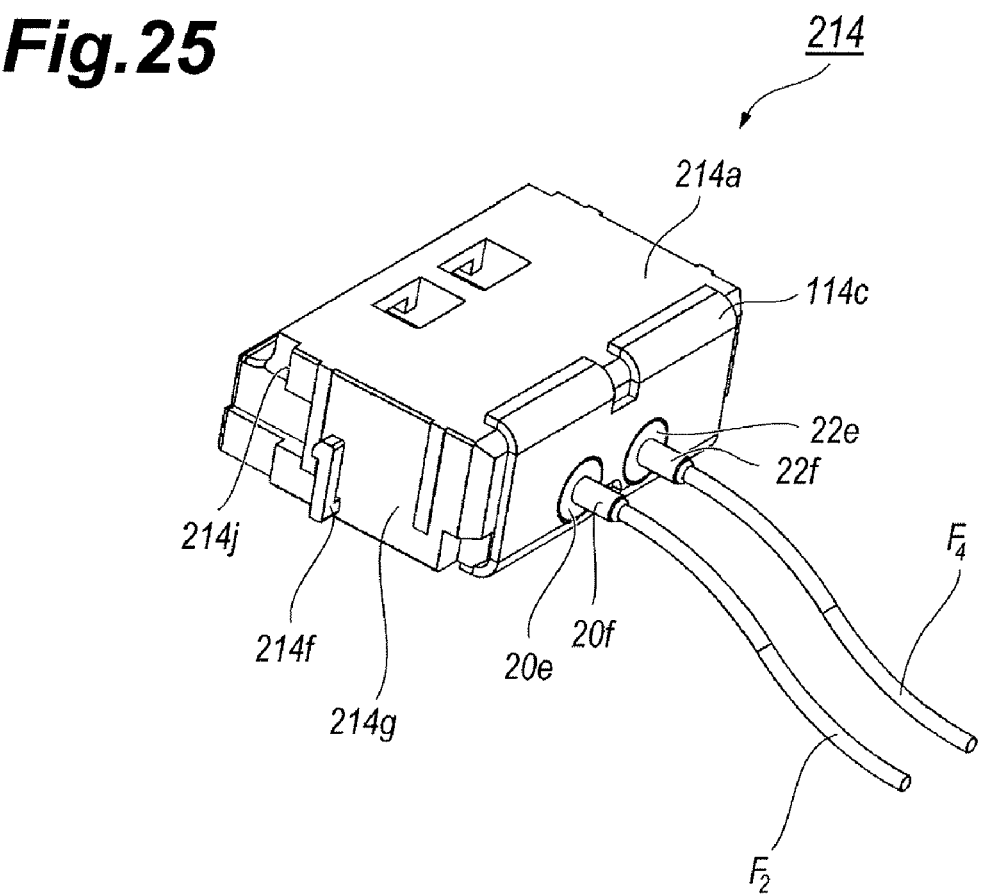
FIG. 25 shows an optical receptacle according to another embodiment of the invention, where the optical receptacle shown in FIG. 25 has the LC type configuration.

FIG. 25 shows another embodiment of the optical receptacle 214 according to the present invention. The optical transceiver 1 of the present invention may install the optical receptacle 214 with the LC type configuration instead of the SC type receptacle shown in FIGS. 22a to 23. The pitch between two sleeves of the LC type receptacle is narrower than that of the SC type receptacle. Accordingly, the optical transceiver 1 of the present embodiment provides the double cut; the base cut $S_1$ and the sub cut $S_2$, in the rear wall 111j of the first housing 110a; where the former cut $S_1$ is for the SC type optical receptacle and the latter cut $S_2$ is for the LC type connector. Moreover, the second section $R_2$ provides two types of guiding grooves, $G_2S$ and $G_2L$, as shown in FIGS. 21A and 21B. Two grooves $G_2S$ are prepared for the inner fibers, $F_2$ and $F_4$, drawn from the sleeve assembly of the SC type receptacle 114; while, the grooves $G_2L$ are prepared for the inner fibers, $F_2$ and $F_4$, output from the LC type receptacle 214. Thus, the optical transceiver 1 according to the present embodiment may be applicable to two types of the optical receptacles, namely, the SC type receptacle and the LC type receptacle.

Figure 26A:
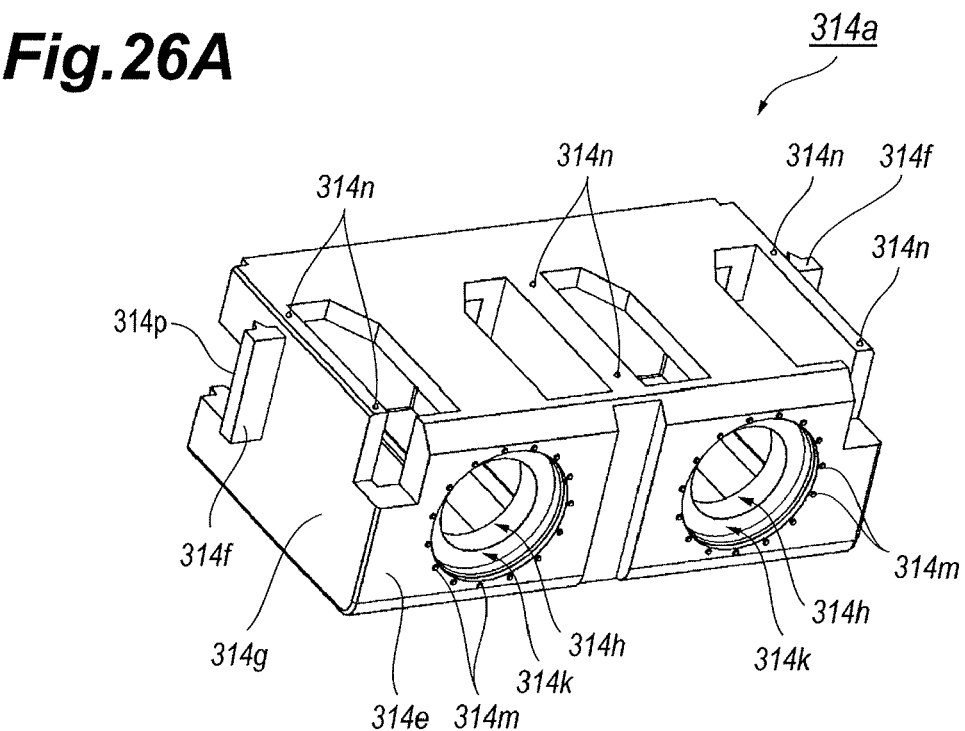
FIGS. 26A and 26B show an optical receptacle according to still another embodiment of the invention.
Figure 26B:
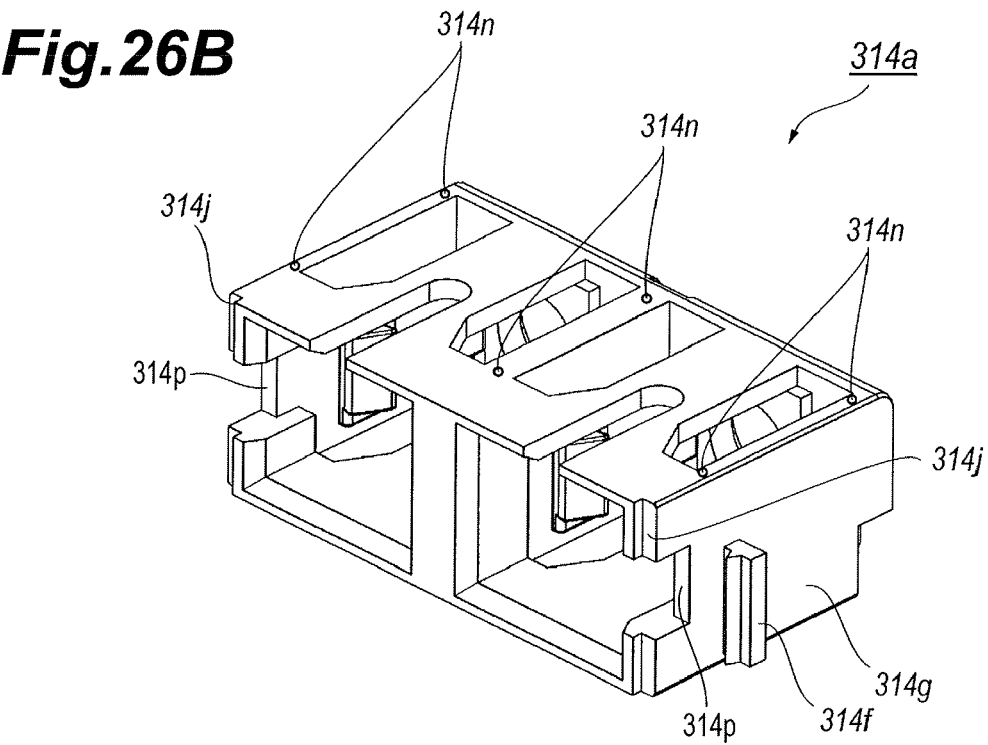

FIGS. 26A and 26B illustrate still another embodiment of the optical receptacle 314 applicable to the optical transceiver 1. The receptacle housing 314a shown in FIGS. 26A and 26B has features in the lug 314f and protrusions 314n distinguishable from the former embodiments.

The lug 314f in the present embodiment has a crushable rib when the lug 314 is set within the pocket 111k of the first housing 110a. Specifically, the lug 314f provides a rib extending vertically and having a triangular cross section. A width from the tip of the rib to the rear surface of the lug 314f is slightly greater than a longitudinal size of the pocket 111k; accordingly, the tip of the rib may be crushed when the lug 314f is set within the pocket 111k, which may push the optical receptacle 314 against the rear wall 111j.

The receptacle housing 314a further provides a plurality of protrusions, 314n and 314m, not only in the periphery of the opening 314h and the step 314k but also in the top and bottom surfaces of the receptacle housing 314a. When the first housing 110a and the second housing 110b are assembled with others as putting the optical receptacle 314 therebetween, the tip of respective protrusions 314n may be crushed, which may reliably hold the optical receptacle 314 between the housings, 110a and 110b. Moreover, when the face cover 12 is set in the front wall 110d of the first housing 110a as pushing the optical receptacle 314 against the rear wall 111j, the tip of the protrusions 314m may be crushed, which may reliably fix the optical receptacle 314 in the center area 111a.

In the embodiments of the optical receptacle thus described, the lugs are each formed in a position measured from the front surface of the receptacle housing which is common to both lugs in respective side walls. However, the lugs in respective side walls may be arranged diagonally and the pockets 111k corresponding to the lugs may be also formed diagonally in respective side walls 111i. The diagonal arrangement of the lugs, 114f, 214f, and 314f and the pockets 111k may protect the optical receptacle, 114, 213 and 314, from being set reversely. Moreover, the conductive sheet, 14 and 114, described above is exemplarily shown by a metal plate; however, the conductive sheet may be a type of double layers of a rubber and a metal sheet. In such an example, the metal sheet is put between the optical receptacle 114, 214, and 314, and the rear wall 111j such that the metal sheet comes in contact with the rear wall 111j.

Next, a mechanism of the screw latch 16 will be described. As already described, the face cover 12 is fixed to the first housing 10a with screws so as to expose the cavity of the optical receptacle 14 from the optical port 12a of the face cover 12 as pushing the optical receptacle 14 against the rear wall 11j of the first housing 10a.

Figure 27:
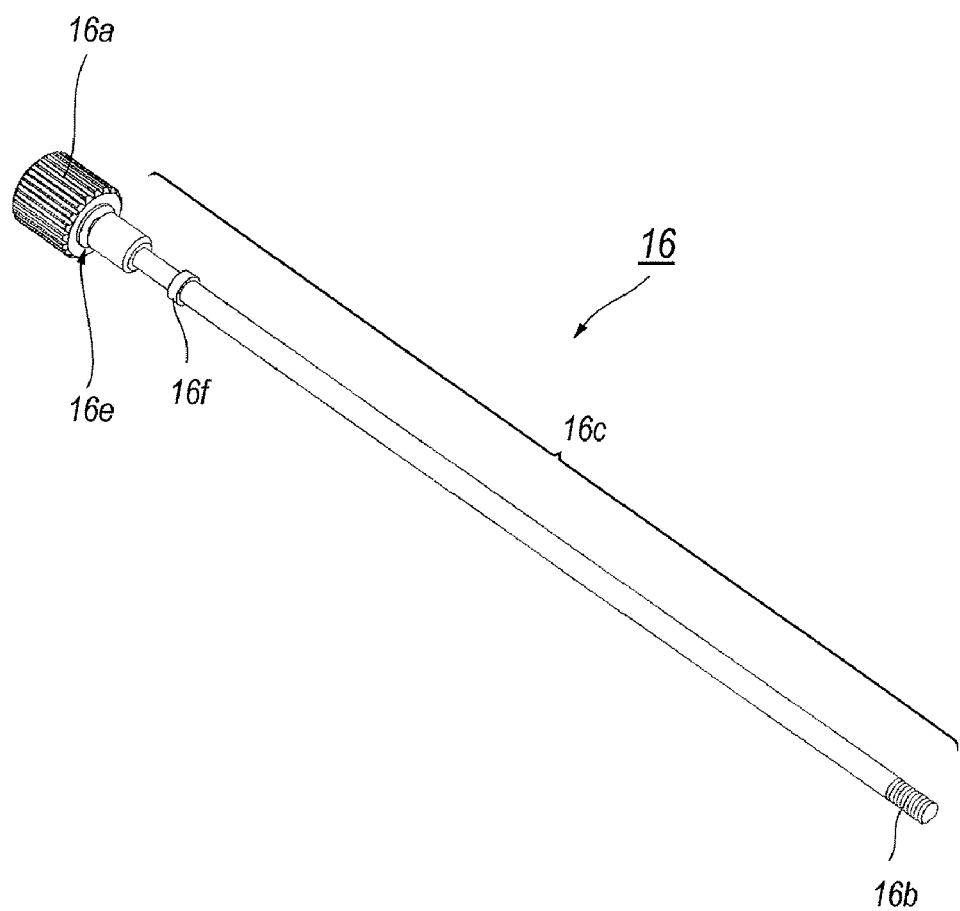
FIG. 27 shows a screw latch according to an embodiment of the present invention.

FIG. 27 shows the screw latch 16 according to an embodiment of the present invention. The screw latch 16 includes a bar portion 16c with a knob 16a in one end thereof and a thread 16b in the other end which is engaged with the tapped hole of the host connector 3a. The knob 16a is provided for the manual operation for the optical transceiver 1. The bar portion 16c further provides a ringed groove 16e and a flange 16f in a side of the knob 16a. A coil spring is set between the ringed groove 16e and the flange 16f. The screw latch 16 is set in the side space 10g formed in the rib 10c of the first housing 10a.

Figure 28:
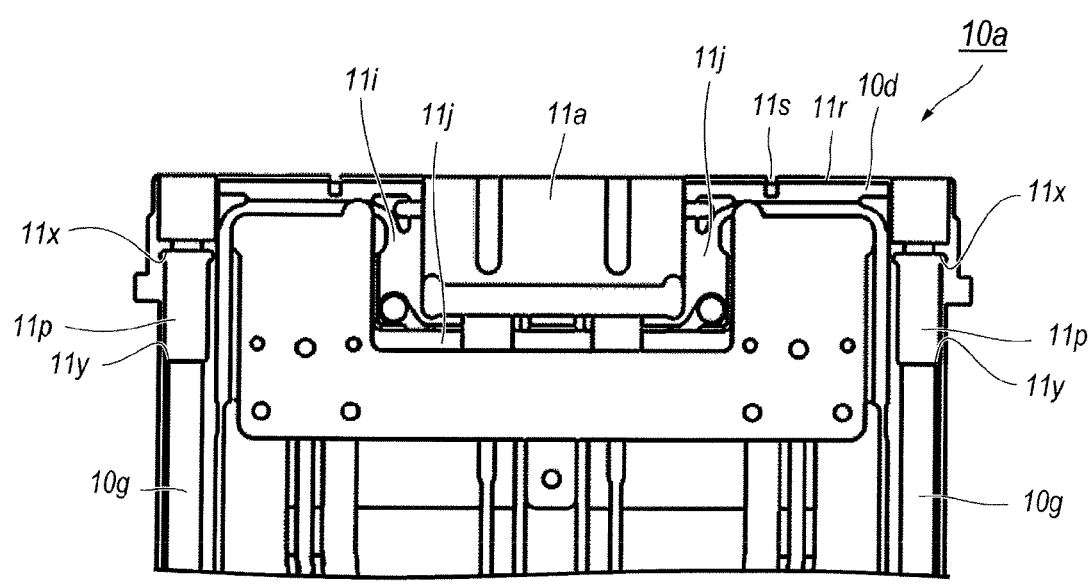
FIG. 28 explains a structure prepared in the housing for setting the screw latch shown in FIG. 27.

FIG. 28 magnifies a front portion of the first housing 10a. The side groove 10g includes a space 11p with a width greater than rest portions of the groove 10g. The space 11p receives the portion between the ringed groove 16e and the flange 16f in which the coil sprig is set. The space 11p provides a front step 11x and a rear step 11y. The front step 11x faces the front surface of the flange 16e, while, the rear step 11y abuts against the coil spring. The coil spring pushes the screw latch 16 forward; accordingly, the knob 16a is pushed forward by the action to release the engagement of the thread 16b with the tapped hole of the host connector, which makes it clear that the optical transceiver 1 is released from the host system.

In a preferred modification, the screw latch 16 may provide a washer in the side of the flange 16f to prevent the coil spring from rotating occurred in the rotation of the screw latch 16 to engage it with the tapped hole of the host connector 3a. Specifically, the space 11p is formed in rectangular and the plane shape of the washer may be rectangular, which prevent the washer from rotating in the space 11p.

Figure 29:
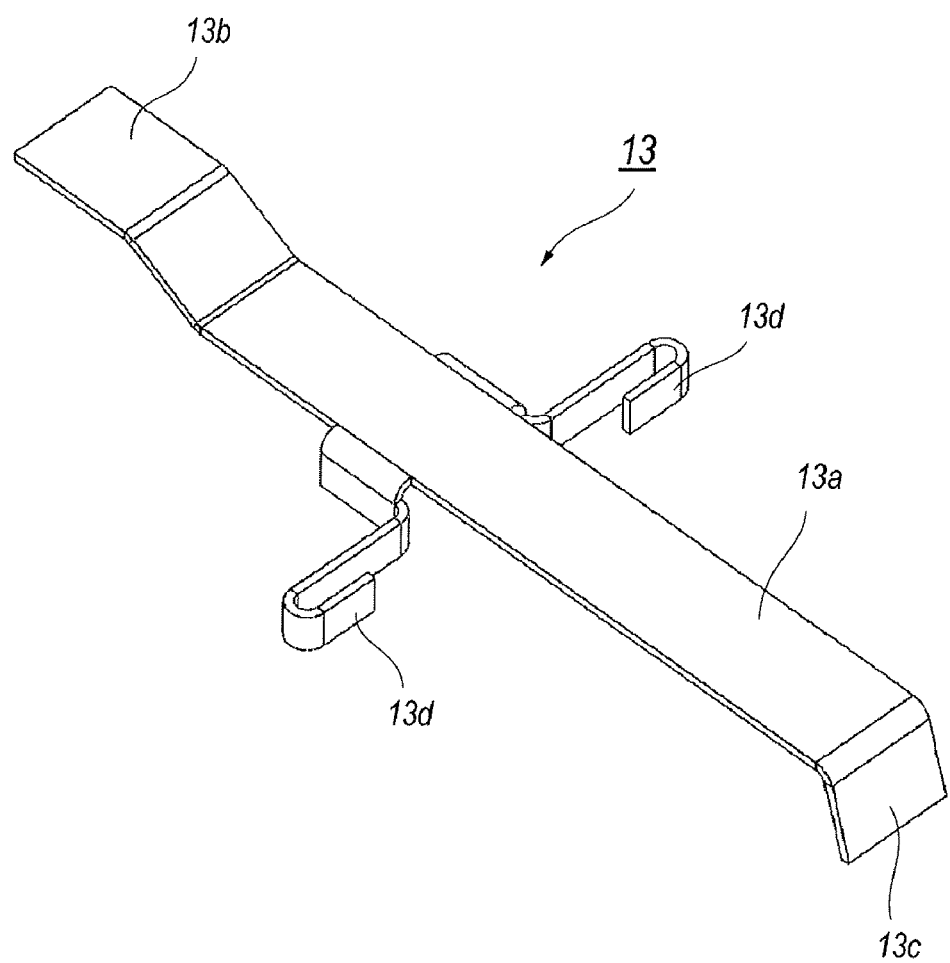
FIG. 29 is a perspective view showing a latch bar according to an embodiment of the present invention.

Referring to FIG. 28 again, the first housing 10a provides the front wall 10d with a lateral groove 11r in the front surface thereof, which may be referred in FIG. 21B. The groove 11r extends from the center, where the optical receptacle 14 is to be installed, to the side close to the knob 16a. A latch bar 13 is set within the groove 11r. FIG. 29 shows the latch bar 13 made of metal plate and includes a band portion 13a, a hooked portion 13b, and a pushed portion 13c. The pushed portion 13c is bent rearward, while the hooked portion 13b is stepped forward.

The latch bar 13 may further include an elastic portion 13d in the middle of the band portion 13a. The elastic portion 13d extends up and down and causes a lateral pressure to the latch bar 13, that is, the latch bar 13 is pushed toward the optical receptacle 14 by the elastic portion 13d. The front wall 10d of the first housing 10a may further provide in the front surface thereof another groove 11s extending up and down to receive the elastic portion 13d of the latch bar 13. The elastic portion 13d may be bent in the groove 11s.

On the other hand, the optical receptacles shown in FIGS. 22A to 22C, 26A and 26B, may provide cuts, 114p, and 314p, in the side wall thereof to pass the latch bar 13. The pushed portion 13c of the latch bar 13 protrudes into the cavity of the optical receptacle, as passing the band portion 13a thereof through the cut of the optical receptacle. The pushed portion 13c is bent rearward in the cavity.

Figure 30A:
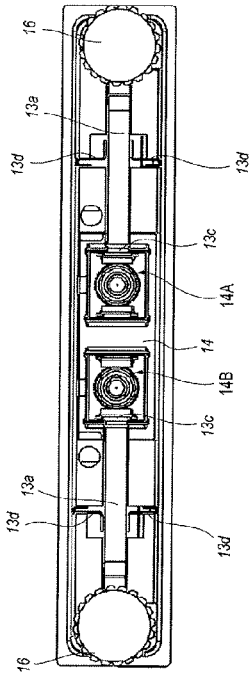
Figure 30C:
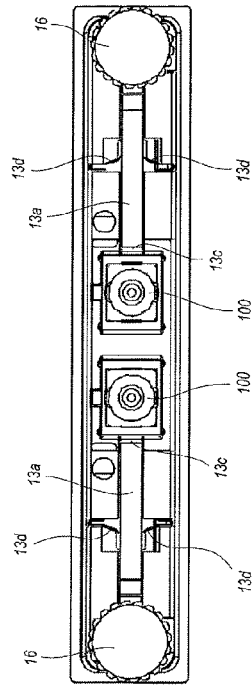
FIGS. 30C and 30D are a cross section and a front view, respectively, of the latch bar and the screw latch when the optical receptacle receives the external connector.
Figure 30B:
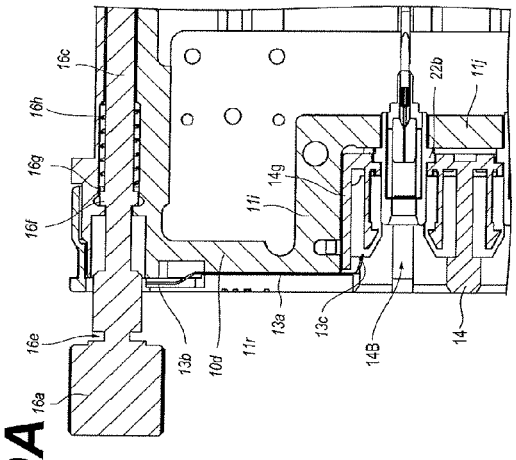

FIG. 30A is a cross section of the front portion of the optical transceiver 1 when the optical transceiver 1 is free from the host system 2, that is, the screw latch 16 is disengaged with the tapped hole. FIG. 30B is a front view of the optical transceiver 1, which removes the face cover 12 to show the front wall 10d thereof. As described above, the latch bar 13 is pushed toward the optical receptacle 14 by the elastic force of the elastic portion 13d. When the cavity 14B is free from an external optical connector 100, that is the cavity 14B does not receive the external connector 100, the latch bar 13 in the pushed portion 13c protrudes into the cavity 14B.

Under the arrangement described above when the screw latch 16 is free from the tapped hole, the insertion of the external connector 100 into the cavity 14B may be prevented because the tip of the hooked portion 13b abuts against the screw latch 16 and the pushed portion 13c is left within the cavity 14B. On the other hand, when the screw latch 16 is engaged with the tapped hole, the tip of the hooked portion 13b is aligned with the ringed groove 16e of the screw latch 16. Inserting the external connector 100 into the cavity 14B, the external connector 100 pushes the pushed portion 13c of the latch bar 13 and the tip of the hooked portion 13b thereof may be escaped into the ringed groove 16e. Moreover, when the tip of the hooked portion 13b is escaped into the ringed groove 16e, the screw latch 16 is unable to be disengaged with the tapped hole, because the hooked portion 13b prevents the screw latch 16 from moving frontward.

Accordingly, the optical transceiver 1 of the present embodiment, when the external connector 100 is mated with the optical receptacle 14, which means that the optical transceiver 1 is engaged with the host system 2 by screwing the latch bar 16 with the tapped hole of the host system 2, may prevent two cases, one of which is that the external connector is unable to be inserted into the optical receptacle 14 when the optical transceiver 1 is free from the host system 2, and the other case is that the optical transceiver 1 is unable to be extracted from the host system 2 when the external connector 100 is engaged with the optical receptacle 14.

Figure 30D:
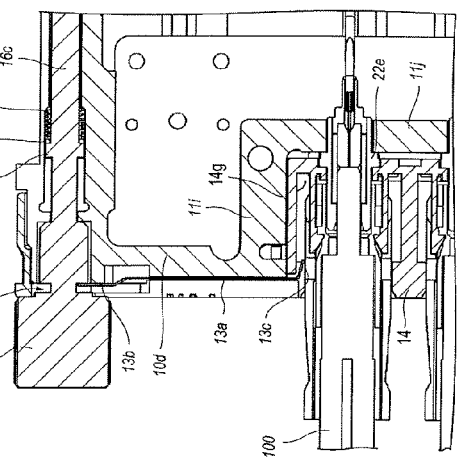

The elastic portion 13d shows a function of a leaf spring, that is, as shown in FIG. 30D, the elastic portion 13d is bent by the insertion of the external connector 100 into the optical receptacle 14, and the elastic portion 13d pushes back the latch bar 13 as the cavity 14B becomes vacant. Although the figures only show a case that the latch bar 13 has the bent pushed portion 13c, the pushed portion 13c may has an arched shape.

Second Embodiment

Next, a process to assembly the optical transceiver 1 according to the second embodiment of the present invention will be described in detail. The process described below assumes a condition that the optical transceiver 1 provides the housing 100, the front tray 124, the rear tray 136, and the inner connector 126 of the second embodiment.

The process first installs the rear tray 136 on the fourth section $R_4$, the optical multiplexer 20 and the optical demultiplexer 22 on respective positions. Then, the process wires the inner fibers, $F_2$ to $F_8$.

Figure 31A:
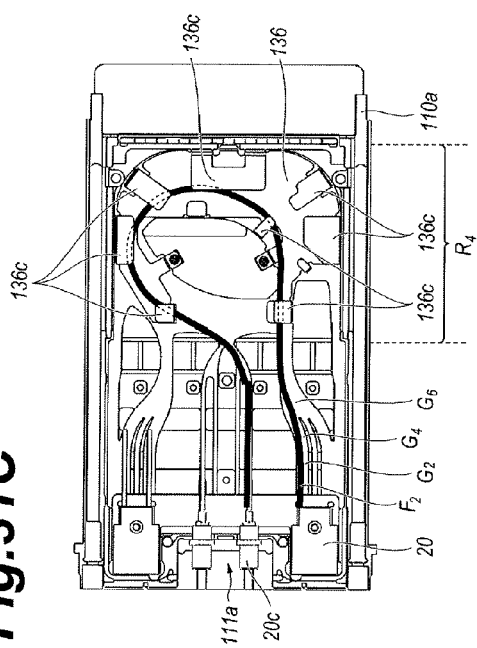
FIGS. 31A to 31D show the processes to wire the inner fibers.

As shown in FIG. 31A, setting the inner fiber $F_6$ extended from the optical multiplexer 20 within the grooves, $G_2$ and $G_4$, formed in the sections, $R_2$ and $R_3$, of the transmitter side, the inner fiber $F_6$ is extended to the fourth section $R_4$. Guiding the fiber $F_6$ along the rear tray 136 to turn to the receiver side, and drawing along the side of the receiver side, the fiber $F_6$ reaches the first section $R_1$. Eaves 136c provided in the rear tray 136 may prevent the fiber $F_6$ from straying out. Various eaves 136c in the rear tray 136 may be optionally used depending on the surplus length of the inner fiber $F_6$.

Figure 31B:
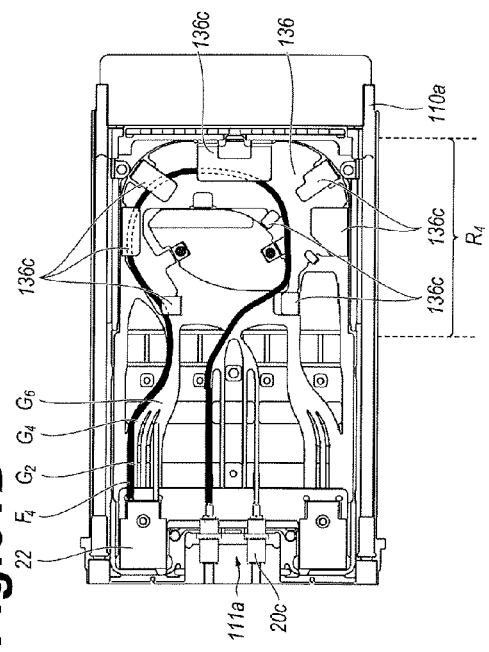

As shown in FIG. 31B, setting the inner fiber $F_8$ extended from the optical demultiplexer 22 within the grooves, $G_2$ and $G_4$, formed in the sections, $R_2$ and $R_3$, of the receiver side, the inner fiber $F_8$ is extended to the fourth section $R_4$. Guiding the fiber $F_8$ along the rear tray 136 to turn to the transmitter side, and drawing along the side of the transmitter side, the fiber $F_8$ reaches the first section $R_1$. Eaves 136c provided in the rear tray 136 may prevent the fiber $F_8$ from straying out. Various eaves 136c in the rear tray 136 may be optionally used depending on the surplus length of the inner fiber $F_8$.

The inner fibers $F_6$ and $F_8$ may be installed with a ferrule 20b, a coil spring 20a and a flange 20d in advance to the wiring thereof.

Figure 31C:
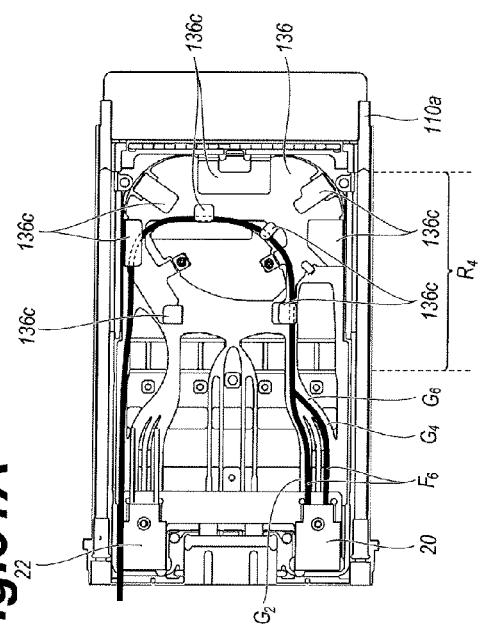

Next, the process may draw the inner fiber $F_2$ extended from the optical multiplexer 20 within the grooves, $G_2$ to $G_6$, to the fourth section $R_4$ as shown in FIG. 31C. Guiding the fiber $F_2$ along the rear tray 136 toward the receiver side, then the fiber $F_2$ is set in one of the grooves, $G_2S$ or $G_2L$, corresponding to the type of the optical receptacle 14 to be mounted in the center area 111a. The eaves 136c in the rear tray 136 may guide the inner fiber $F_2$ and prevent the fiber $F_2$ from straying out. Various eaves 136c may be also optionally used depending on a length of the fiber $F_2$.

Figure 31D:
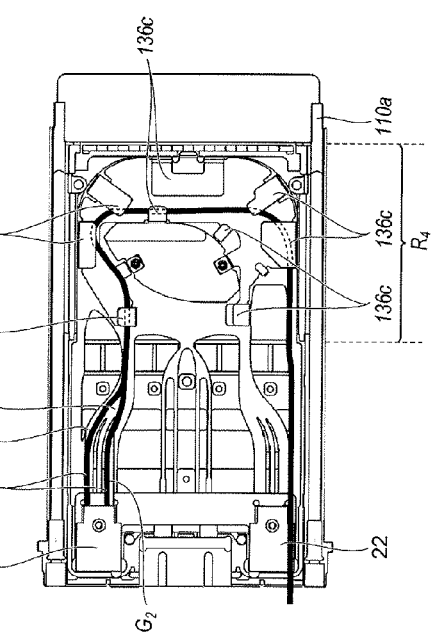

Finally, as shown in FIG. 31D, the inner fiber $F_4$ output from the optical demultiplexer 22 is guided in the grooves, $G_2$ to $G_6$, in second and third sections, $R_2$ and 3, to the front end of the fourth section $R_4$. In the fourth section $R_4$, the inner fiber $F_4$ is bent along the rear tray 136 toward transmitter side, and is guided in one of the grooves, $G_2S$ and $G_2L$, depending on the type of the optical receptacle 14 to the center area 111a. The eaves 136c may also prevent the inner fiber $F_4$ from straying out. Various eaves 136c may be optionally used depending on a length of the fiber $F_4$.

The optical receptacle 114 may build, in advance to the wiring of the inner fibers, $F_2$ and $F_4$, the receptacle housing 114a and the sleeve holder 114b with the conductive sheet 114c. Subsequent to the wiring of the inner fibers, $F_2$ to $F_8$, the sleeve 20c is inserted into the opening 114h in the rear wall 114e of the optical receptacle 114 through the opening 114r in the conductive sheet 114c. The optical receptacle 114, thus assembled with the sleeves, 20c and 22c, are mounted on the center area 111a of the first housing 110a. In this process, the lugs 114f prepared in the side wall of the optical receptacle 114 are set within the pocket 111k.

Figure 32:
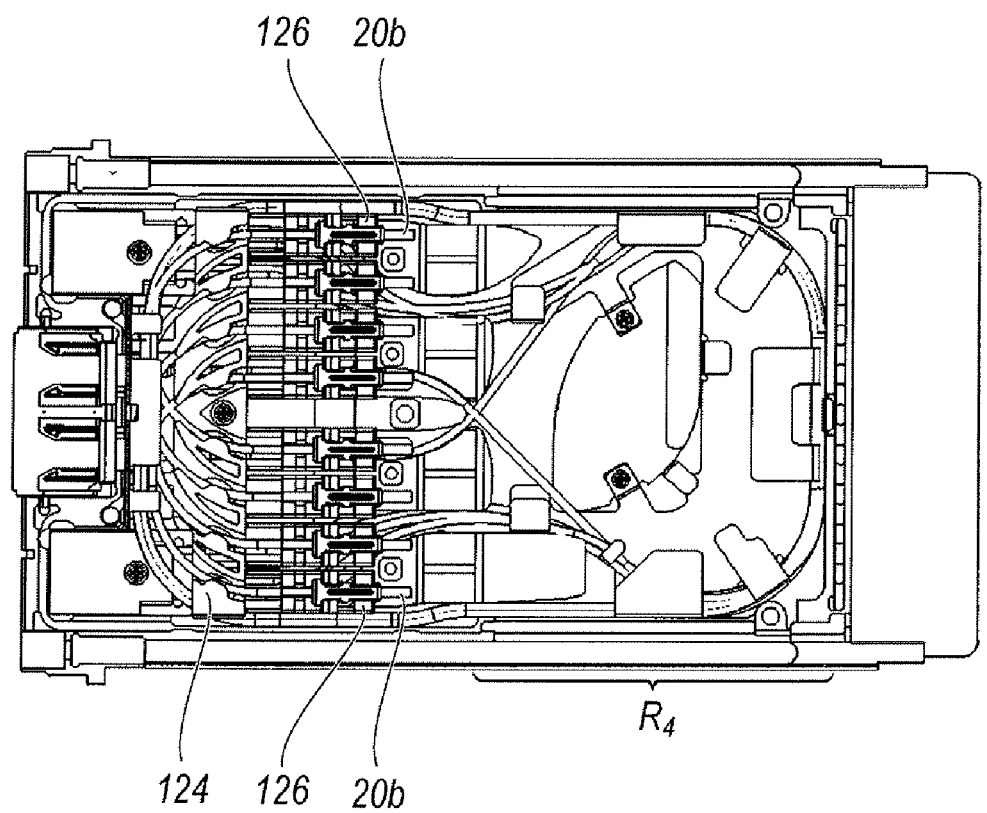
FIG. 32 shows a process to set the inner fiber into the front tray.

Then, the front tray 126 is fixed on the second section $R_2$. The inner fibers $F_6$ wired in the side end of the receiver side are drawn under the ceiling 124s of the front tray 124, drawn under the front eaves 124x to the transmitter side, and finally guided in respective slots 124a of the front tray 124. Each fiber $F_6$ is guided by the guide walls, 124t and 124u, the front wall 124v, the front eaves 124x, and slot eaves 124d. While, the other inner fibers $F_8$, which are wired in the side of the transmitter side, are drawn under the ceiling 124s, under the front eaves 124x to the receiver side, and finally guided to respective slots 124a. Each fiber $F_8$ is also guided by the guide walls, 124l and 124u, the front wall and eaves, 112v and 124x, and respective slot eaves 124d. Thus, the inner fibers, $F_6$ and $F_8$, may be wired without straying out, as shown in FIG. 32.

Figure 33A:
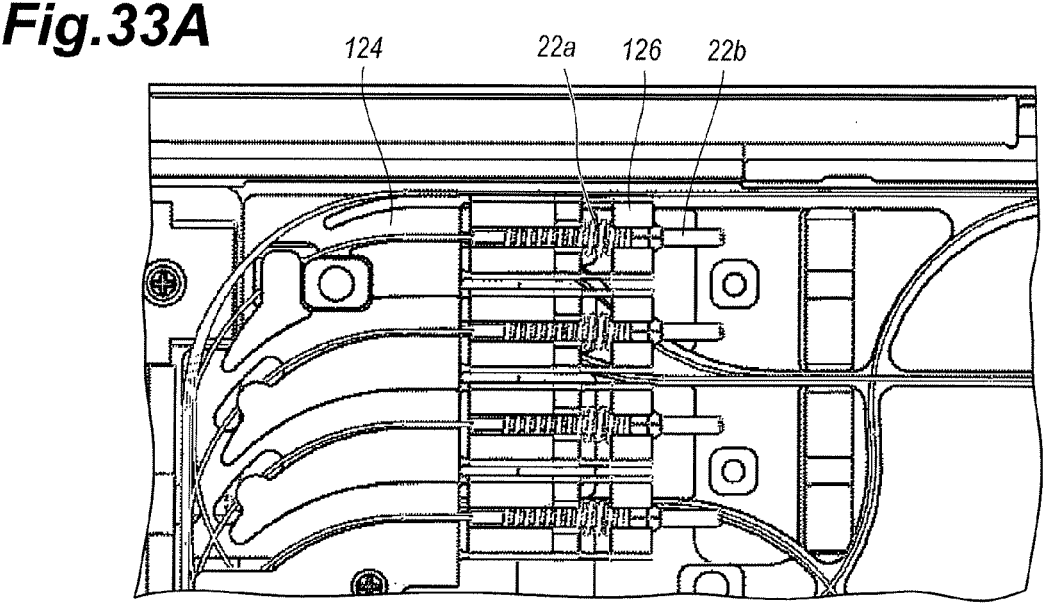
Figure 33B:
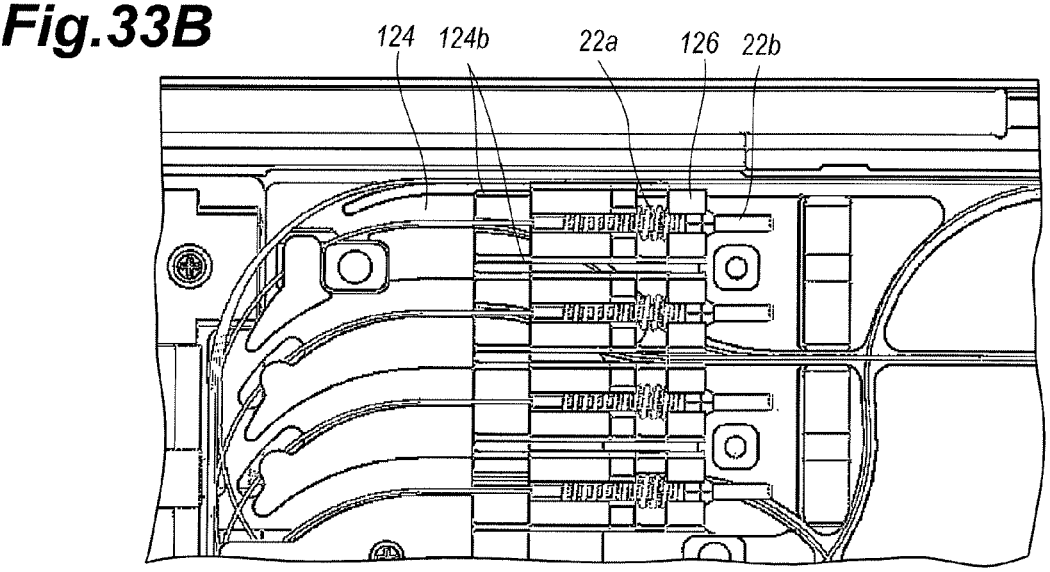
FIG. 33B shows a process when the inner connector in another position not to interfere the OSAs.

Next, the process assembles the inner connectors 126 with the front tray 124. Specifically, the latch finger 124b of the front tray 124 is inserted into the groove 126e of the inner connector 126, and temporarily sets the end of the ferrule 20b in a position where the inner fiber $F_6$ may optically couple with the OSA, 30 and 32. FIG. 33B corresponds to the coupling position. Then, sliding the inner connector 126 frontward such that the tip of the latch finger 124b is set in the second pocket 126n, the ferrule 20b does not interfere with the installation of the OSAs, 30 and 32. FIG. 33A corresponds to this escaped position.

Figure 34:
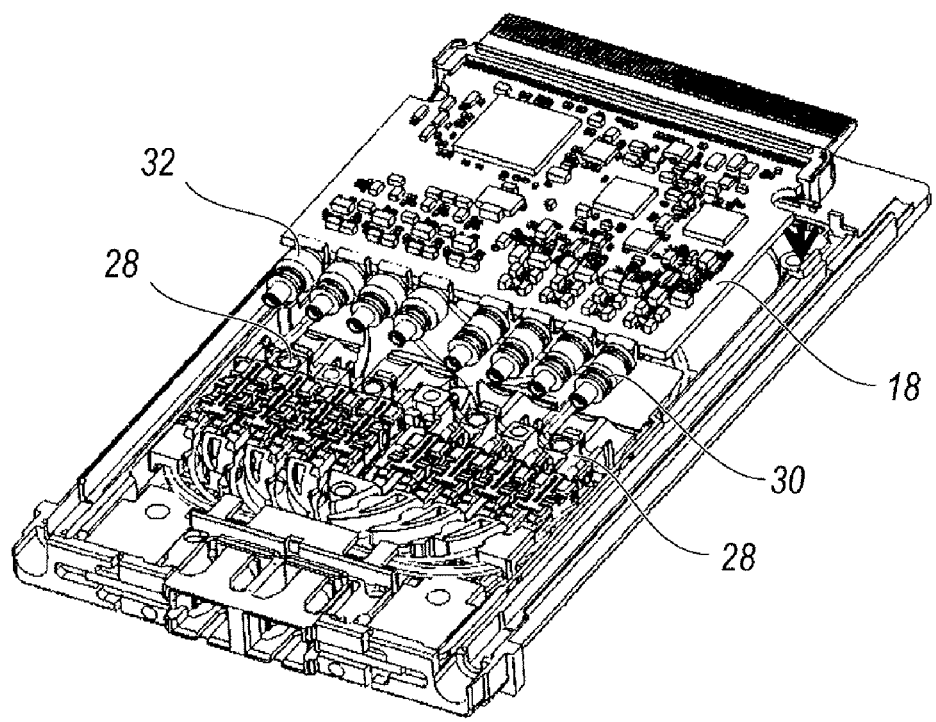
FIG. 34 shows a process to mount the OSAs and two boards of the circuit board and the plug board on the housing.

Next, the latch unit 128 is set in its regular position and the OSAs, 30 and 32 are set in the latch unit 128, as shown in FIG. 34. In advance to the installation of the circuit board 18, the OSAs, 30 and 32 are connected with respective FPCs 18d. Mounting the circuit board 118 on the first housing 110a, and inserting the rib 19e of the plug board 19 into the groove 10v of the first housing 10a, the optical and electrical components are installed on the first housing 10a. In advance to the installation of the circuit board 18, the gasket 34b may be set within the groove 101, and the metal cover 35 may be set in the groove 10v.

Sliding the inner connector 126 rearward so that the tip of the latch finger 124b is set in the first pocket 126m in the groove 126e of the inner connector 126, and engaging the projection 128c of the latch unit 128 with the opening 126d of the inner connector 126, the tip of the ferrule 20b may come in physically contact with the stub 30u in the OSA, 30 and 32.

Finally, the face cover 12 is fixed to the first housing 110a as putting the optical receptacle 14 between the face cover 12 and the rear wall 111j of the center area 111a. Setting the other gasket 34a in the groove 111m of the second housing 110b and the other metal cover 35 in the groove 11v, and fixing the second housing 110b to the first housing 110a, the optical transceiver 1 may be completed.

What is claimed is:

1. An optical communication apparatus for a wavelength division multiplex communication, comprising:
   a plurality of optical components including:
      an optical receptacle configured to couple with an external optical connector;
      a plurality of optical subassemblies, each processing an optical signal having a specific wavelength different from others; and
      an optical unit arranged between said optical subassemblies and said optical receptacle, said optical unit processing said optical signals,
   an electrical component including,
      a circuit board configured to mount an electronic circuit electrically coupled with said optical subassemblies;
   a plurality of inner fibers each coupling one of said optical subassemblies with said optical unit; and
   a housing configured to install said optical components, said electrical component and said inner fibers therein,
   wherein said housing is divided into two sections, one of which installs only said optical components, and another of which installs only said electrical component, and
   wherein each of said inner fibers is coupled with one of said subassemblies in a pluggable form.

2. The optical communication apparatus of claim 1, wherein said inner fibers are arranged under said circuit board in said other section, and under said optical unit in said one section.

3. The optical communication apparatus of claim 1, wherein said optical components further includes:
   a plurality of inner connectors each provided in an end of said inner fiber and coupled with one of said optical subassemblies in said pluggable form; and
   a front tray supports said inner connectors and arranges said inner fibers.

4. The optical communication apparatus of claim 3, wherein said optical components further includes,
   a latch unit configured to arrange said optical subassemblies, said inner connectors being coupled with said latch unit in two positions.

5. The optical communication apparatus of claim 4, wherein said latch unit is arranged over said inner fibers.

6. The optical communication apparatus of claim 5, wherein said front tray is arranged over said inner fibers.

7. The optical communication apparatus of claim 5, wherein said front tray provides a plurality of slots each receiving one of said inner fibers and having a pair of latch fingers to engage said inner connector.

8. The optical communication apparatus of claim 7, wherein each of said slots of said front tray provides an eave to prevent said inner fiber set in said slot from straying out.

9. The optical communication apparatus of claim 7, wherein said front tray provides a guide to turn said inner fibers from a longitudinal direction to a lateral direction.

10. The optical communication apparatus of claim 7, wherein said front tray, said inner connector, and said latch unit constitute said pluggable form.

11. The optical communication apparatus of claim 1 further comprising a rear tray arranged under said circuit board, said rear tray guiding said inner fibers drawn from said one section so as to head to said one section.

12. The optical communication apparatus of claim 11, wherein said rear tray further provides a plurality of eaves to prevent said inner fibers from straying out.

13. The optical communication apparatus of claim 1, wherein said one section of said housing provides a plurality of terraces for mounting said optical components thereon, and said another section of said housing provides a plurality of terraces whose outer periphery defines a curvature of said inner fibers.

14. The optical communication apparatus of claim 13, wherein said terraces provided in said other section come in contact with said electronic circuits mounted on said circuit board.

15. The optical communication apparatus of claim 1, wherein said housing provides a plurality of grooves extending from said one section to said other section, and
wherein said inner fibers are set within said grooves.

16. The optical communication apparatus of claim 15, wherein said grooves in said one section provides a first pair of grooves and a second pair of grooves, and
wherein said first pair of grooves have a distance substantially equal to a distance between two fibers set in a SC-type optical receptacle, and said second pair of grooves have a distance substantially equal to a distance between two fibers set in an LC-type optical receptacle.

17. The optical communication apparatus of claim 1, wherein said housing provides an area for mounting said optical receptacle, said area being partitioned from said one section by a rear wall, and
wherein said optical receptacle is mounted on said area as putting a conductive sheet between said optical receptacle and said rear wall.

* * * * *